(12) United States Patent
Garcia

(10) Patent No.: US 10,320,164 B2
(45) Date of Patent: Jun. 11, 2019

(54) GROUNDING CLIP

(71) Applicant: RXL, INC., Moorpark, CA (US)

(72) Inventor: Eddie Garcia, Moorpark, CA (US)

(73) Assignee: RXL, INC., Moorpark, CA (US)

( * ) Notice: Subject to any disclaimer, the term of this patent is extended or adjusted under 35 U.S.C. 154(b) by 12 days.

(21) Appl. No.: 15/815,379

(22) Filed: Nov. 16, 2017

(65) Prior Publication Data

US 2018/0076605 A1 Mar. 15, 2018

Related U.S. Application Data

(63) Continuation-in-part of application No. 15/147,627, filed on May 5, 2016, now abandoned.

(51) Int. Cl.

| H02G 3/04 | (2006.01) |
|---|---|
| H01R 13/648 | (2006.01) |
| H01R 4/48 | (2006.01) |
| H01R 4/64 | (2006.01) |
| H02G 3/06 | (2006.01) |
| F16B 35/00 | (2006.01) |
| F16B 1/00 | (2006.01) |
| F16B 2/12 | (2006.01) |
| F16B 2/24 | (2006.01) |

(52) U.S. Cl.
CPC ........ *H02G 3/0456* (2013.01); *H01R 4/4809* (2013.01); *H01R 4/64* (2013.01); *H01R 13/648* (2013.01); *H02G 3/0406* (2013.01); *H02G 3/0608* (2013.01); *F16B 2/12* (2013.01); *F16B 2/243* (2013.01); *F16B 35/005* (2013.01); *F16B 2001/0064* (2013.01)

(58) Field of Classification Search
USPC ...................................... 174/70 R
See application file for complete search history.

(56) References Cited

U.S. PATENT DOCUMENTS

| 1,880,081 A | 9/1932 | Frederickson |
|---|---|---|
| 2,247,282 A | 6/1941 | Webb |
| 2,316,166 A | 4/1943 | Huguelet |
| 2,972,002 A | 2/1961 | Wayman |
| 3,019,409 A | 1/1962 | Sarafinas |
| 3,173,227 A | 3/1965 | Clark |
| 3,414,663 A | 12/1968 | James |
| 3,486,158 A | 12/1969 | Soltysik et al. |
| 3,521,843 A | 7/1970 | Ogle |
| 3,551,876 A | 12/1970 | Walter |
| 3,618,882 A | 11/1971 | Podedworny |
| 3,627,900 A | 12/1971 | Robinson |
| 3,697,924 A | 10/1972 | Oliver |
| 3,780,209 A | 12/1973 | Schuplin |
| 3,780,351 A | 12/1973 | Salmon et al. |
| 3,810,069 A | 5/1974 | Jaconette |

(Continued)

*Primary Examiner* — William H. Mayo, III
*Assistant Examiner* — Krystal Robinson
(74) *Attorney, Agent, or Firm* — Brooks Acordia IP Law, PC; Pejman Yedidsion

(57) ABSTRACT

A grounding clip including: a head having an aperture disposed in the head; a first leg connected to a first edge of the head; a second leg connected to a second edge of the head, where the first leg and the second leg are substantially parallel; a first resilient tab connected to the first leg at an end distal from the end connected to the head; and a second resilient tab connected to the second leg at an end distal from the end connected to the head.

18 Claims, 20 Drawing Sheets

(56) References Cited

U.S. PATENT DOCUMENTS

| | | | |
|---|---|---|---|
| 3,861,774 A | 1/1975 | Willis | |
| 3,864,009 A | 2/1975 | Wickenberg | |
| 3,887,258 A | 6/1975 | Cunningham et al. | |
| 4,136,423 A | 1/1979 | Sterling | |
| 4,863,189 A * | 9/1989 | Lindsay | B60P 3/32 |
| | | | 280/789 |
| 4,884,976 A | 12/1989 | Franks | |
| 4,966,563 A | 10/1990 | Pierce et al. | |
| 4,993,959 A | 2/1991 | Randolph | |
| 5,006,074 A | 4/1991 | Franks | |
| 5,022,873 A | 6/1991 | Kollmann | |
| 5,078,613 A | 1/1992 | Salmon | |
| 5,114,354 A | 5/1992 | Franks | |
| 5,320,565 A | 6/1994 | Polidori | |
| D351,825 S | 10/1994 | Sachs | |
| 5,491,892 A | 2/1996 | Fritz et al. | |
| 5,816,866 A | 10/1998 | Langdon | |
| 5,867,624 A * | 2/1999 | Forrester | G02B 6/48 |
| | | | 385/100 |
| D408,362 S | 4/1999 | Coll | |
| 6,068,220 A | 5/2000 | Alrey | |
| 6,129,316 A | 10/2000 | Bauer | |
| 6,174,177 B1 | 1/2001 | Auclair | |
| 6,252,171 B1 * | 6/2001 | Barr | H02G 3/0456 |
| | | | 174/95 |
| 6,380,486 B1 * | 4/2002 | Hemingway | H02G 3/0431 |
| | | | 174/502 |
| 6,431,885 B1 | 8/2002 | Stroup | |
| 6,484,997 B1 | 11/2002 | Edwards et al. | |
| 6,494,726 B1 | 12/2002 | Auclair | |
| 6,877,996 B1 | 4/2005 | Franks | |
| D577,977 S | 10/2008 | Hernandez | |
| 7,545,447 B2 | 6/2009 | Matsumura et al. | |
| 7,547,228 B1 | 6/2009 | Schlarman | |
| 8,864,504 B1 | 10/2014 | Gretz | |
| 9,373,943 B1 * | 6/2016 | Tannenbaum | H02G 3/0437 |
| 9,634,445 B1 | 4/2017 | Brandon et al. | |
| 2002/0062969 A1 | 5/2002 | Kumagai | |
| 2004/0154818 A1 | 8/2004 | Franks | |
| 2008/0029301 A1 * | 2/2008 | Makwinski | H02G 3/0418 |
| | | | 174/481 |
| 2008/0155915 A1 | 7/2008 | Howe et al. | |
| 2009/0047810 A1 | 2/2009 | Seidel | |
| 2009/0242270 A1 | 10/2009 | Rumsey | |
| 2012/0244729 A1 | 9/2012 | Rivera et al. | |
| 2014/0026412 A1 | 1/2014 | Ishida | |
| 2014/0168842 A1 * | 6/2014 | Martinez | H02H 9/04 |
| | | | 361/91.1 |
| 2014/0329420 A1 * | 11/2014 | Magno | H01R 11/26 |
| | | | 439/803 |
| 2015/0008295 A1 | 1/2015 | Bae et al. | |
| 2015/0050822 A1 | 2/2015 | MacAllister | |
| 2015/0105930 A1 | 4/2015 | Sparrowhawk et al. | |

\* cited by examiner

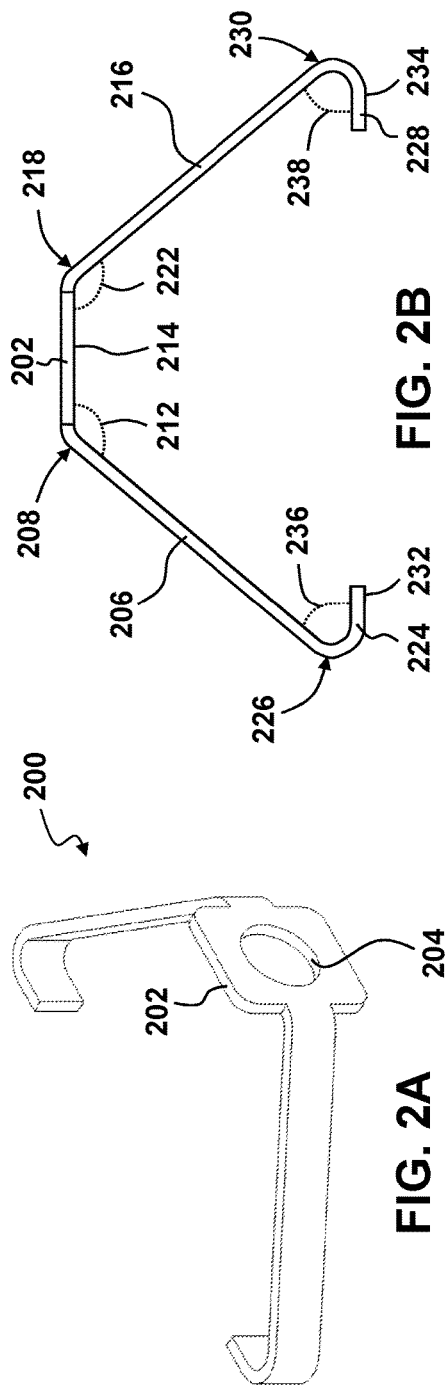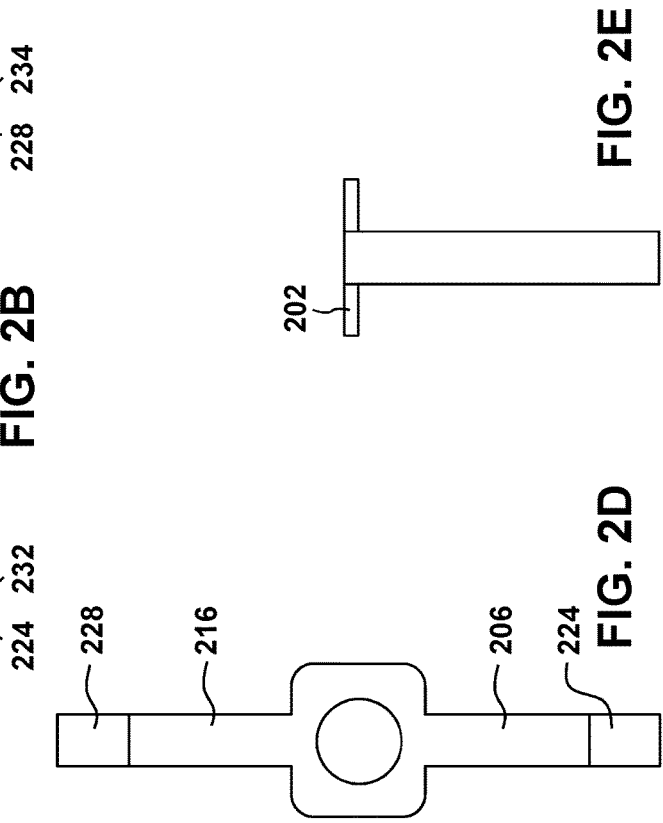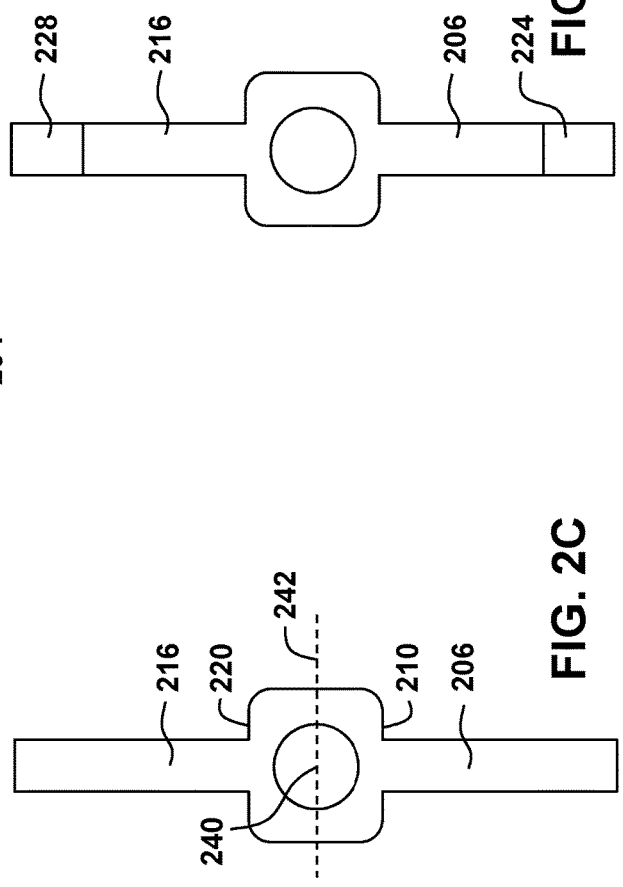

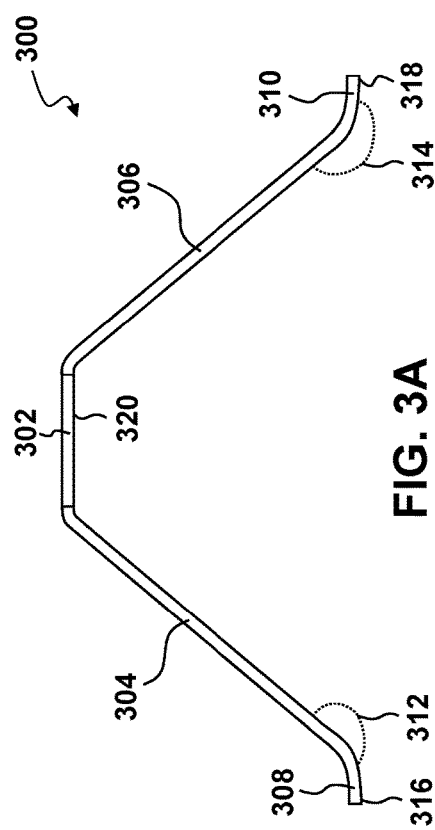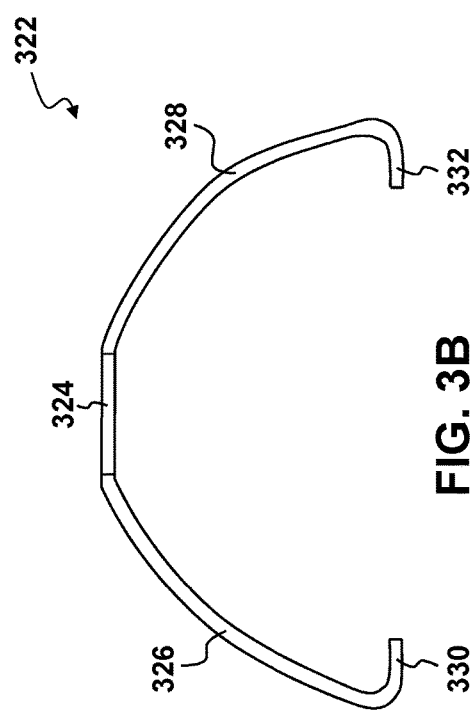
FIG. 3A
FIG. 3B

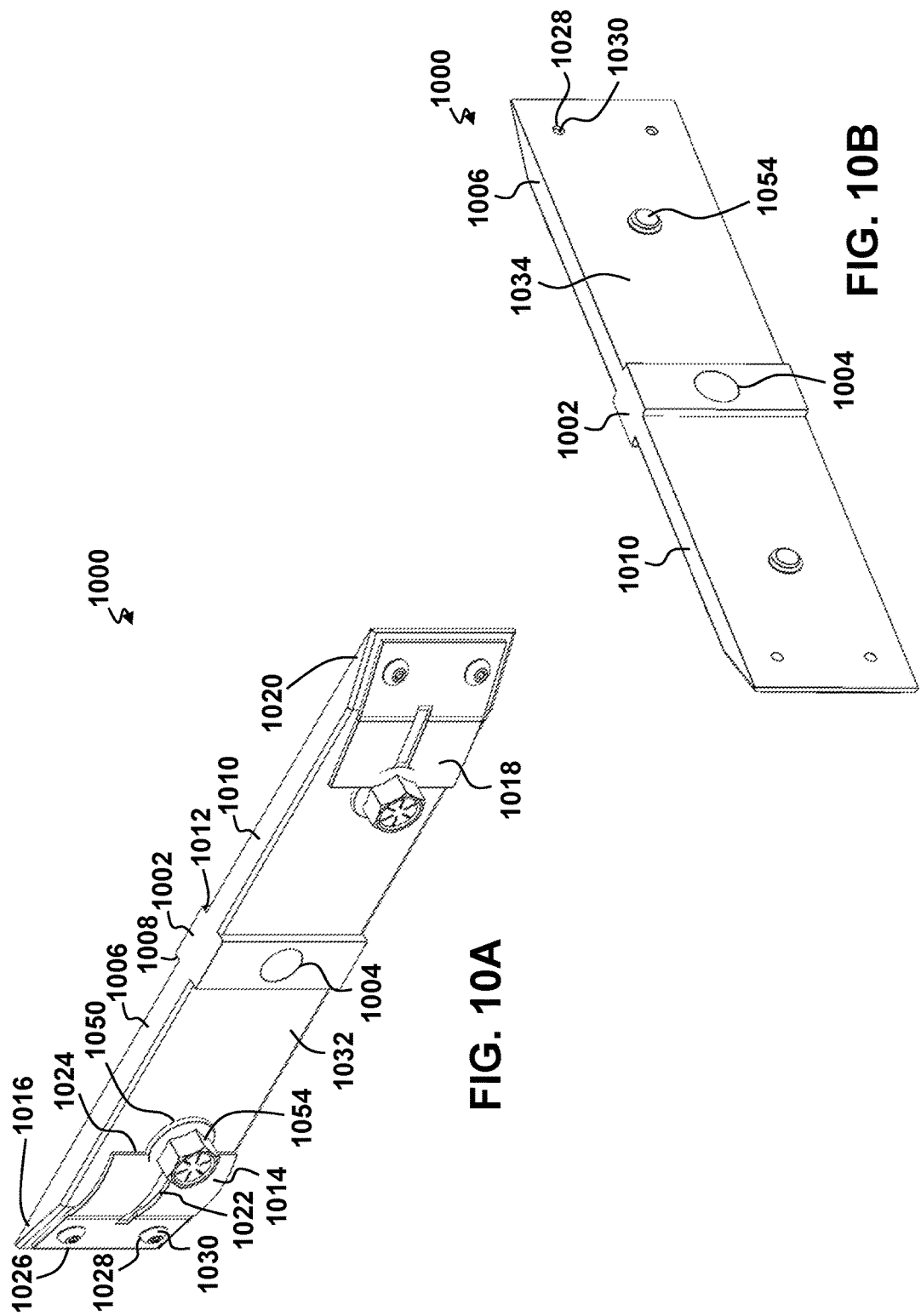

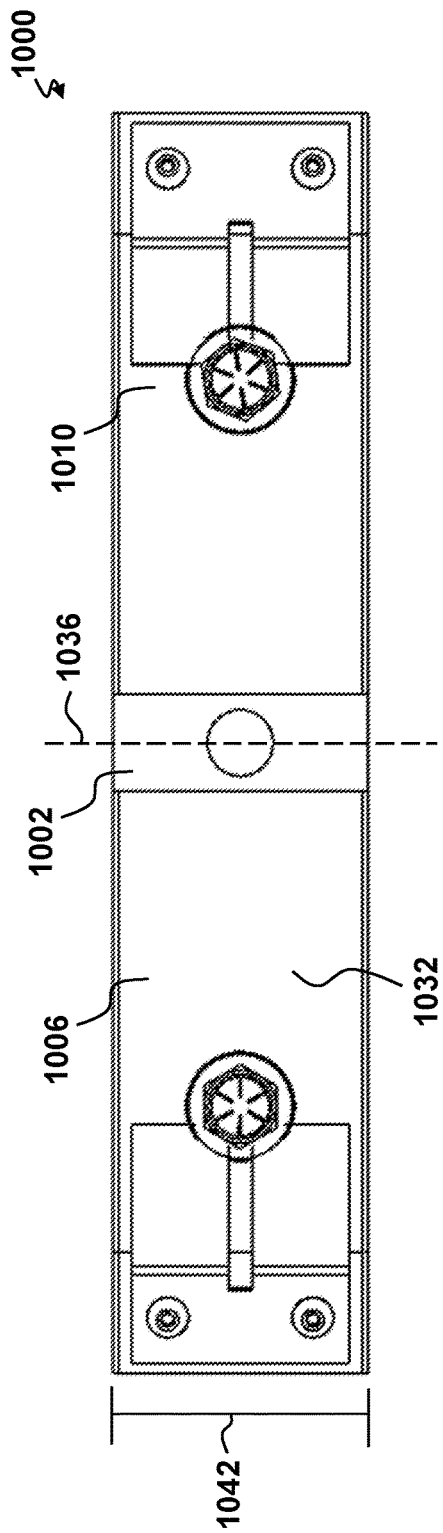
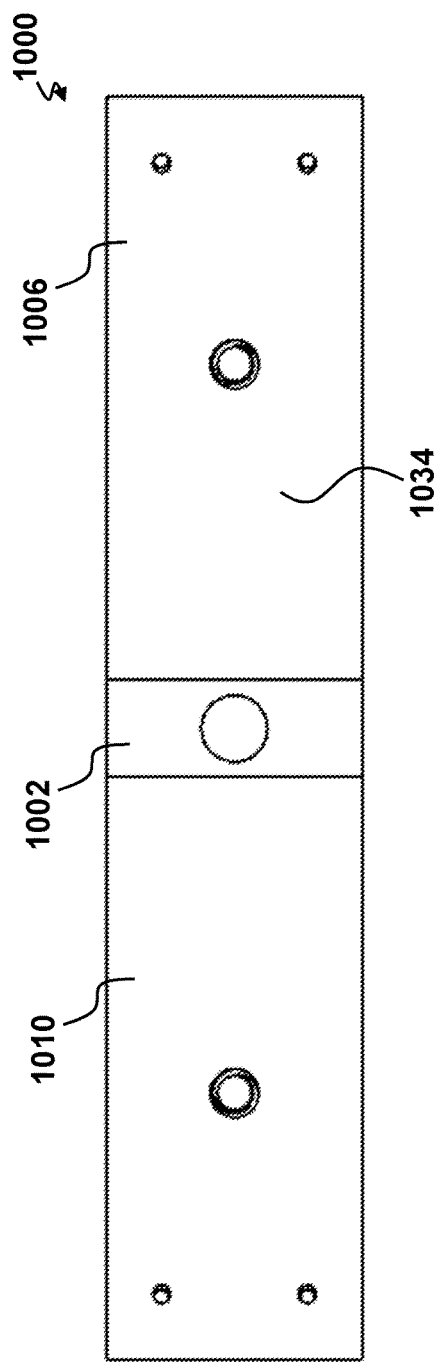
FIG. 10C
FIG. 10D

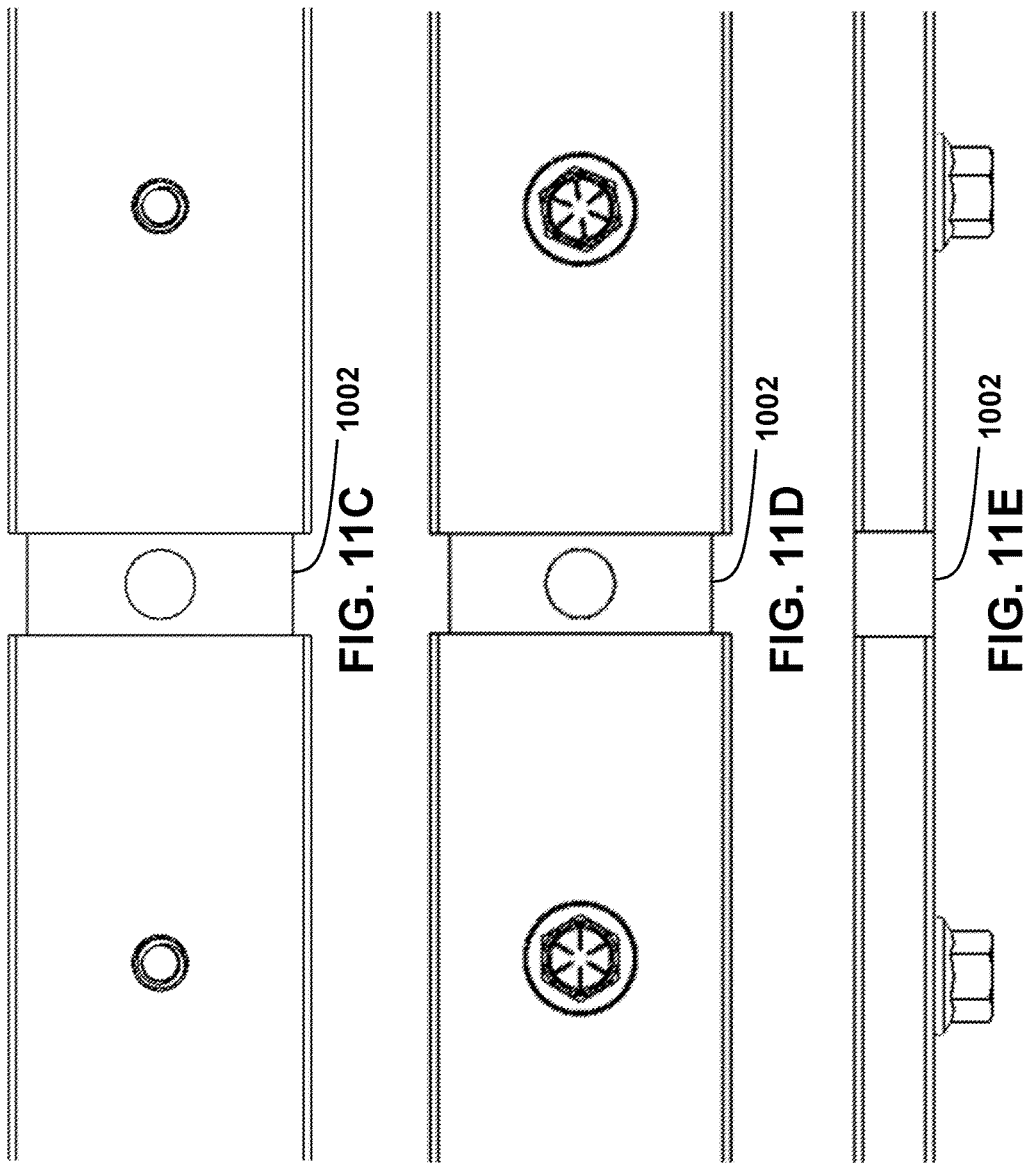

GROUNDING CLIP

CROSS-REFERENCE TO RELATED APPLICATION

This application is a continuation-in-part of U.S. Non-provisional patent application Ser. No. 15/147,627, filed May 5, 2016, which is incorporated herein by reference in its entirety for all purposes.

TECHNICAL FIELD

The invention relates to cable runways, and more particularly to grounding cable runways.

BACKGROUND

Cable runways are used to support cables in a horizontal cable run between racks and/or cabinets. Multiple cable runway sections may be connected to form extended horizontal cable runs. Each cable runway section must be electrically connected in order to ground the entire cable runway run. Existing methods of grounding involve grinding powder coated paint off of the surfaces of the cable runway in order to establish electrical contact via a grounding strap. This approach may result in particles that could interfere with the operation of expensive electronic equipment in the racks and/or cabinets. Additionally, this grounding process is time consuming, requires additional tools, and requires expertise to use these tools. Cable runways have been in use since around the 1960s and this approach to grounding adjacent cable runway sections has not been improved.

SUMMARY

Exemplary system embodiments may include a grounding clip including: a head having an aperture disposed in the head; a first leg having a proximate end connected to a first edge of the head, where the first leg may be disposed at an obtuse angle relative to a first surface of the head; a second leg having a proximate end connected to a second edge of the head, where the second leg may be disposed at an obtuse angle relative to the first surface of the head, and where the first edge may be opposite the second edge; a first tab connected to the first leg at an end distal from the end connected to the head; and a second tab connected to the second leg at an end distal from the end connected to the head. In additional system embodiments, the grounding clip may be resilient. In additional system embodiments, the grounding clip material may be 1075 Spring steel. In additional system embodiments, a first surface of the first tab and a first surface of the second tab are in a plane parallel to a plane of the first surface of the head. In additional system embodiments, the first tab may be disposed at an acute angle relative to the first leg, and where the second tab may be disposed at an acute angle relative to the second leg. In additional system embodiments, the first tab may be disposed at a reflex angle relative to the first leg, and where the second tab may be disposed at a reflex angle relative to the second leg. In additional system embodiments, the distal end of the first leg and the distal end of the second leg are equidistant from a center of the aperture of the head. In additional system embodiments, the grounding clip may be symmetrical about a plane perpendicular to the first surface of the head.

Additional system embodiments may include a butt splice kit including: a first clamp including a first channel and an aperture; a second clamp including a second channel and an aperture; and a bolt; where the bolt of the butt splice kit may be disposed through the aperture in the first clamp, the aperture in the head of the grounding clip, and the aperture in the second clamp; where a second surface of the head may be disposed on top of the second clamp outside the second channel; and where the first leg and the second leg of the grounding clip are disposed within the first channel of the first clamp. In additional system embodiments, the first clamp may be identical to the second clamp. In additional system embodiments, the butt splice kit further includes: a washer; and a nut; where the bolt may be disposed through the washer, and where the nut may be rotatably secured to the bolt at a distal end of the bolt proximate to the second clamp.

Additional system embodiments may include a first cable runway section including two parallel stringers and a plurality of ladder rungs perpendicular to the two parallel stringers; a second cable runway section including two parallel stringers and a plurality of ladder rungs perpendicular to the two parallel stringers; where a first stringer of the first cable runway section may be disposed between the first clamp and the second clamp in the first channel and the second channel; where a second stringer of the second cable runway section may be disposed between the first clamp and the second clamp in the first channel and the second channel; where the first tab of the grounding clip contacts an inner wall of the first stringer; and where the second tab of the grounding clip contacts an inner wall of the second stringer. In additional system embodiments, an electrical connection between the first cable runway section and the second cable runway section may be established via the grounding clip. In additional system embodiments, the grounding clip may be resilient and deforms to maintain contact between the first cable runway section and the second cable runway section. In additional system embodiments, an outer surface of the first cable runway section includes a non-conductive coating, and where an outer surface of the second cable runway section includes the non-conductive coating. In additional system embodiments, the first stringer of the first cable runway section includes a first notch, where the second stringer of the second cable runway section includes a second notch, and where the head of the grounding clip may be disposed in the first notch of the first stringer and the second notch of the second stringer.

Another exemplary system embodiment may include a first grounding bracket including an L-shaped cross section, where a narrow portion of the first grounding bracket includes a first aperture; a second grounding bracket including an L-shaped cross section, where a narrow portion of the second grounding bracket includes a second aperture; and a set screw disposed in the first aperture of the first grounding bracket and the second aperture of the second grounding bracket; where rotation of the set screw increases a distance between the first grounding bracket and the second grounding bracket. Additional system embodiments may include a first cable runway section including two parallel stringers and a plurality of ladder rungs perpendicular to the two parallel stringers; a second cable runway section including two parallel stringers and a plurality of ladder rungs perpendicular to the two parallel stringers; where the first grounding bracket may be disposed in a first stringer of the first cable runway section; where the second grounding bracket may be disposed in a second stringer of the second cable runway section; where rotation of the set screw causes the first grounding bracket to contact an inner wall of the first stringer and the second grounding bracket to contact an inner wall of the second stringer; and where an electrical connection between the first cable runway section and the second cable runway section may be established via the first grounding bracket, second grounding bracket, and set screw.

An exemplary method embodiment may include positioning an end of a first cable runway section proximate to an end of a second cable runway section; inserting a bolt into an aperture of a first clamp including a first channel; placing the first channel of the first clamp over a first stringer of the first cable runway section and a second stringer of the second cable runway section; inserting a grounding clip into an inside of the first stringer and an inside of the second stringer, where the grounding clip contacts an inner wall of the first stringer and an inner wall of the second stringer, and where an aperture of the grounding clip may be inserted through the bolt; placing a second channel of a second clamp over the first stringer and the second stringer, where an aperture of the second clamp may be inserted through the bolt; and securing a fastener over an end of the bolt; where an electrical connection between the first cable runway section and the second cable runway section may be established via the grounding clip. In additional method embodiments, the grounding clip may further include: a head including the aperture disposed in the head; a first leg having a proximate end connected to a first edge of the head, where the first leg may be disposed at an obtuse angle relative to the head; a second leg having a proximate end connected to a second edge of the head, where the second leg may be disposed at an obtuse angle relative to the head, and where the first edge may be opposite the second edge; a first tab connected to the first leg at an end distal from the end connected to the head; and a second tab connected to the second leg at an end distal from the end connected to the head; where the first tab contacts an inner wall of the first cable runway section and the second tab contacts an inner wall of the second cable runway section.

BRIEF DESCRIPTION OF DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIGS. 2A-2E depict perspective, front, top, bottom, and left side views, respectively, of an exemplary grounding clip;

FIGS. 3A-3B depict two alternate embodiments of exemplary grounding clips;

FIGS. 10A-10B depict perspective views of an alternative embodiment of an exemplary grounding clip;

FIG. 10C-10F depict front, back, top, and side views, respectively, of the exemplary grounding clip of FIG. 10A;

FIGS. 11C-11E depict back, front, and top views, respectively, of the exemplary grounding clip of FIG. 10A connecting two cable runway sections;

DETAILED DESCRIPTION

The disclosed device, system, and method allows for electrically connecting adjacent cable runway sections via a resilient grounding clip. The disclosed grounding clip includes a head with an aperture, a first leg, a first tab, a second leg, and a second tab. The grounding clip is inserted between a first clamp and a second clamp of a butt splice kit between adjacent stringers of adjacent cable runways. Tightening the clamps of the butt splice kit around the adjacent stringers deforms the grounding clip and causes contact of the first tab with an inner wall of a first stringer and causes contact of the second tab with an inner wall of a second stringer. Accordingly, the adjacent cable runways, ladder racks, and/or cable raceways made of hollow tubular steel are electrically connected and grounded without the need for special tools and/or training.

Figure 1:
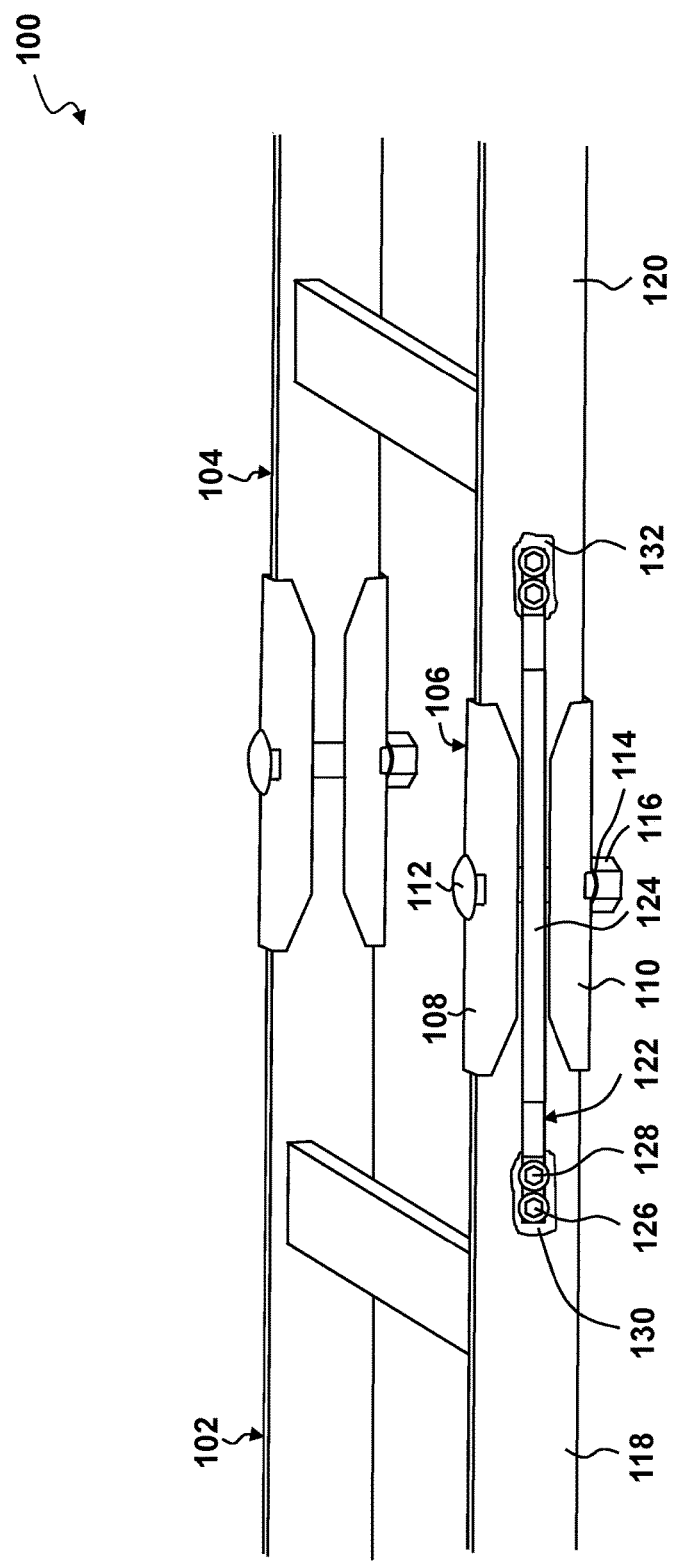
FIG. 1 depicts a perspective view of a prior art grounding strap installed between two adjacent cable runway sections.

FIG. 1 depicts a perspective view of a prior art grounding strap installed between two adjacent cable runway sections 100. A first cable runway section 102 includes two parallel stringers and a plurality of ladder rungs perpendicular to the two parallel stringers. A second cable runway section 104 includes two parallel stringers and a plurality of ladder rungs perpendicular to the two parallel stringers. Each cable runway section (102, 104) may be supported from a floor and/or ceiling at a set distance, e.g., every five feet. The first cable runway section 102 may be identical to the second cable runway section 104. The cable runway sections (102, 104) may be connected via a butt splice kit (106), which may include a first clamp 108 having a channel and an aperture, a second clamp 110 having a channel and an aperture, a bolt 112 which goes through the apertures of the first clamp 108 and the second clamp 110, a washer 114, and a nut 116. Specifically, a first stringer 118 of the first cable runway section 102 may be connected to a second stringer 120 of the second cable runway section 104. Each of the two parallel stringers may be connected via a respective butt splice kit 106.

One side of the cable runway sections (102, 104) may be electrically connected to ground the entire cable runway. A grounding strap kit 122 may be installed between the first stringer 118 and the second stringer 120 to electrically connect the cable runway sections (102, 104). The grounding strap kit 122 includes a grounding strap 124 and a plurality of fasteners (126, 128), e.g., bolts, washers, split-lock washers, and nuts.

Most cable runway sections (102, 104) are powder coated and thus do not have an electrically conductive surface. In order to install the grounding strap kit 122, an installer has to use a high speed rotary tool to remove (130, 132) the powder coated paint from the surface of the stringers (118, 120) where the distal ends of the grounding strap 124 contact the stringers (118, 120). The installer may also have to drill holes into the stringers (118, 120) to accommodate the plurality of fasteners (126, 128).

FIGS. 2A-2E depict perspective, front, top, back, and left side views, respectively, of an exemplary grounding clip 200. Angles are depicted as dotted lines with planes depicted as dashed lines. The grounding clip 200 includes a head 202 having an aperture 204 disposed in the head 202. The aperture 204 may be sized to fit a bolt of a butt splice kit. A first leg 206 of the grounding clip 200 has a proximate end 208 connected to a first edge 210 of the head 202. The first leg 206 is disposed at an obtuse angle 212 relative to a first surface 214 of the head 202. A second leg 216 of the grounding clip 200 has a proximate end 218 connected to a second edge 220 of the head 202. The second leg 216 is disposed at an obtuse angle 222 relative to the first surface 214 of the head 202. The angles (212, 222) of the first leg 206 and the second leg 216 relative to the first surface 214 of the head 202 may be identical. A first tab 224 of the grounding clip 200 may be connected to the first leg 206 at an end 226 distal from the end 208 connected to the head 202. A second tab 228 of the grounding clip 200 may be connected to the second leg 216 at an end 230 distal from the end 218 connected to the head 202.

The grounding clip 200 may be resilient, e.g., heat-treated 4130 steel, and capable of retaining its original shape after being deformed. A first surface 232 of the first tab 224 and a first surface 234 of the second tab 228 may be in a plane parallel to a plane of the first surface 214 of the head 202. The first tab 224 may be disposed at an acute angle 236 relative to the first leg 206. The second tab 228 may be disposed at an acute angle 238 relative to the second leg 216. The angles (236, 238) of the first tab 224 relative to the first leg 206 and the second tab 228 relative to the second leg 216 may be identical. In some embodiments, the distal end 226 of the first leg 206 and the distal end 230 of the second leg 216 may be equidistant from a center 240 of the aperture 204 of the head. The grounding clip 200 may be symmetrical about a plane 242 perpendicular to the first surface 214 of the head 202.

FIGS. 3A-3B depict two alternate embodiments of exemplary grounding clips. FIG. 3A depicts an exemplary grounding clip 300 having a head 302 with an aperture, a first leg 304, a second leg 306, a first tab 308, and a second tab 310. Angles are depicted as dotted lines. The first tab 308 may be disposed at a reflex angle 312 relative to the first leg 304. The second tab 310 may be disposed at a reflex angle 314 relative to the second leg 306. A first surface 316 of the first tab 308 and a first surface 318 of the second tab 310 may be in a plane parallel to a plane of the first surface 320 of the head 302. The angles (312, 314) may be identical. In some embodiments, the angles (312, 314) may be varied.

FIG. 3B depicts an exemplary grounding clip 322 having a head 324 with an aperture, a curved first leg 326, a curved second leg 328, a first tab 330, and a second tab 332. The legs (326, 328) of the grounding clip 322 may be substantially straight, curved, wavy, corrugated, or any other shape. Elements of the disclosed grounding clip may be combined, removed, and/or modified to electrically connect adjacent cable runways connected via butt splice kits. Embodiments are shown for grounding clips connecting cable runways at a straight, i.e., 180 degree, angle. However, the same principles disclosed herein may be applied to grounding clips for connecting between cable runways at non-straight angle, e.g., a 45 degree or 90 degree angle.

Figure 4:
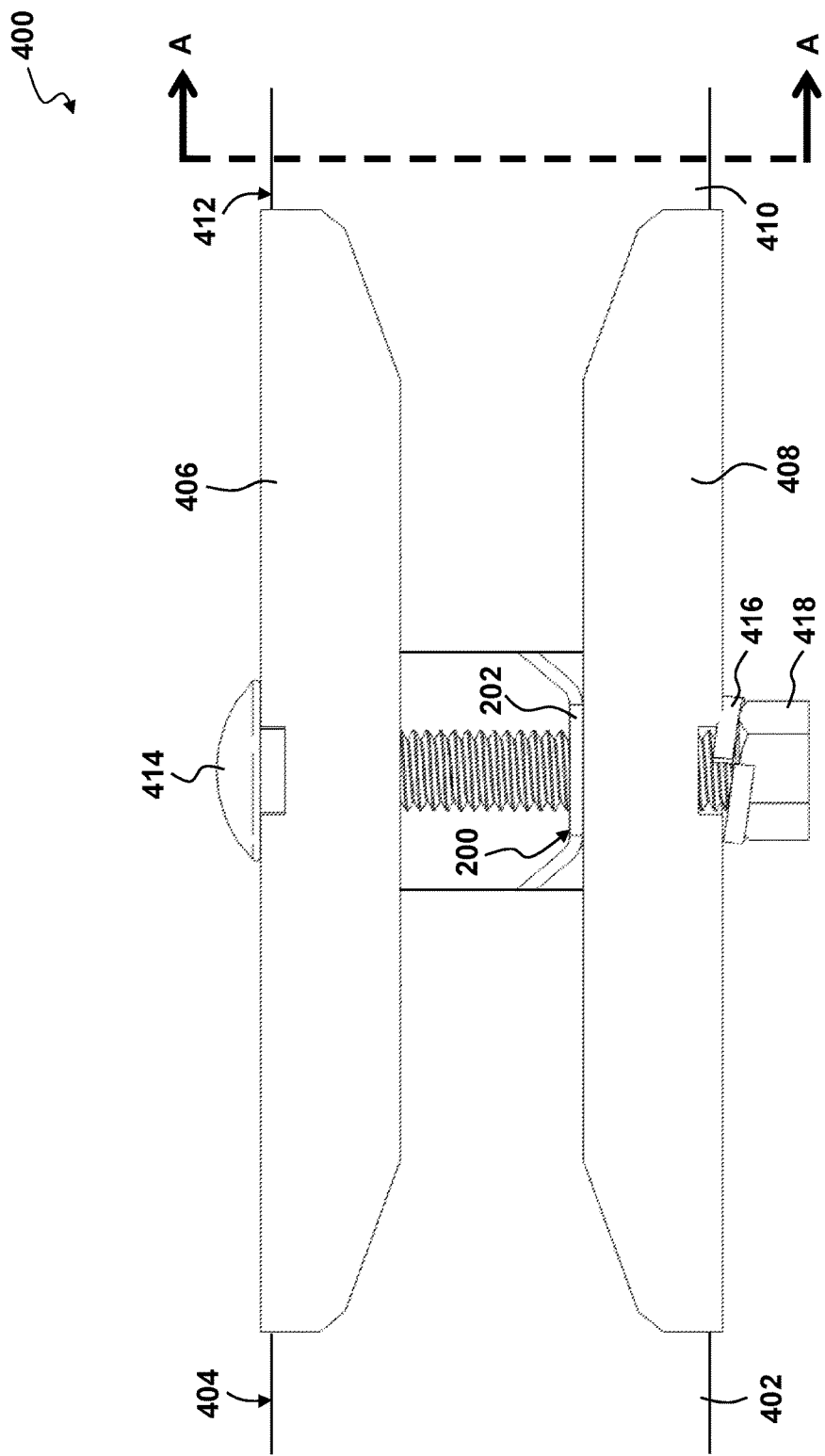
FIG. 4 depicts the exemplary grounding clip of FIGS. 2A-2E installed in a butt splice kit connecting two cable runway sections.

FIG. 4 depicts the exemplary grounding clip of FIGS. 2A-2E installed in a butt splice kit connecting two cable runway sections 400. A first stringer 402 of a first cable runway section 404 is disposed between a first clamp 406 and a second clamp 408, in a first channel of the first clamp 406 and a second channel of the second clamp 408. A second stringer 410 of a second cable runway section 412 is disposed between the first clamp 406 and the second clamp 408, in the first channel of the first clamp 406 and the second channel of the second clamp 408. The surface of each stringer is covered in a non-conductive material, e.g., powder coating and/or paint.

A bolt 414 is disposed through an aperture of the first clamp 406, an aperture in the head 202 of the grounding clip 200, and an aperture of the second clamp 408. A washer 416, e.g., a split-nut washer, and a nut 418 are rotatably secured to a distal end of the bolt 414 proximate to the second clamp 408. The head 202 of the grounding clip 200 is disposed on top of the second clamp 408 and outside the second channel. The first clamp 406 and the second clamp 408 may be identical.

The first tab of the grounding clip 200 contacts an inner wall of the first stringer 402. The second tab of the grounding clip 200 contacts an inner wall of the second stringer 410. Tightening the nut 418 about the bolt 414 compresses the clamps (406, 408) about the stringers (402, 410) and deforms the grounding clip 200 to force the tabs of the grounding clip 200 up against the inner walls of the stringers (402, 410). The grounding clip 200 may be resilient to maintain the tabs against the inner walls of the stringers (402, 410). A recessed portion of the inside of each stringer (402, 410) proximate to each open end may contain a non-conductive material, e.g., excess paint and/or powder coating during surface application. The geometry of the grounding clip 200 and position of each tab ensures that the tabs of the grounding clip 200 are contacting conductive surfaces, i.e., metal not covered by powder-coated paint, on the inner walls of each stringer (402, 410). The grounding clip provides an electrical connection between the first cable runway section 404 and the second cable runway section 412.

Figure 5:
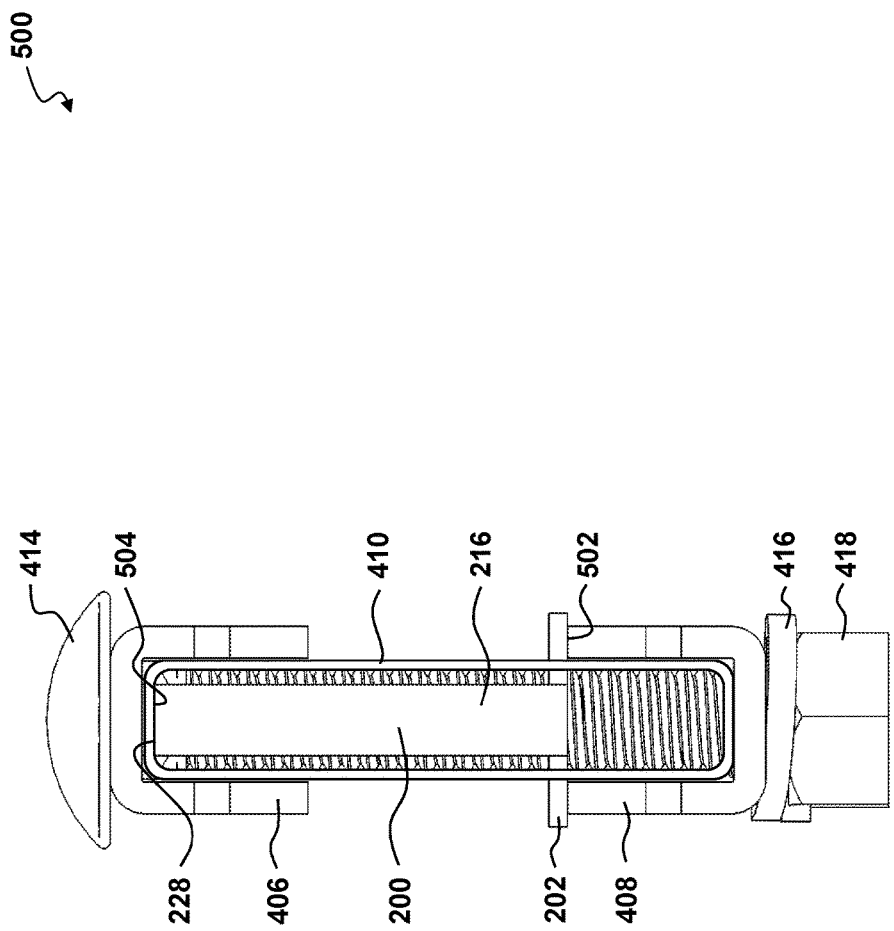
FIG. 5 depicts a cross-sectional view of the exemplary grounding clip, butt splice kit, and cable runway section of FIG. 4 across line A-A.

FIG. 5 depicts a cross-sectional view of the exemplary grounding clip, butt splice kit, and cable runway section of FIG. 4 across line A-A. The bolt 414 is disposed through the aperture of the first clamp 406, the aperture of the head 202 of the grounding clip 200, and the aperture of the second clamp 408. The bolt 414 is secured via a washer 416 and nut 418 proximate to the second clamp 408. As the nut 418 is rotatably secured about the bolt 414, the first clamp 406 and the second clamp 408 tighten around the second stringer 410. The head 202 of the grounding clip 200 has a greater width than the second channel of the second clamp 408. Accordingly, a second surface 502 of the head 202 is disposed on top of the second clamp 408. As the space between the first clamp 406 and the second clamp 408 is reduced during tightening of the nut 418, the grounding clip 200 will resiliently deform such that the first surface 228 of the second tab contacts an inner wall 504 of the second stringer 410. The same contact occurs on the other side of the grounding clip 200 between the first surface of the first tab and the inner wall of the first stringer.

Figure 6:
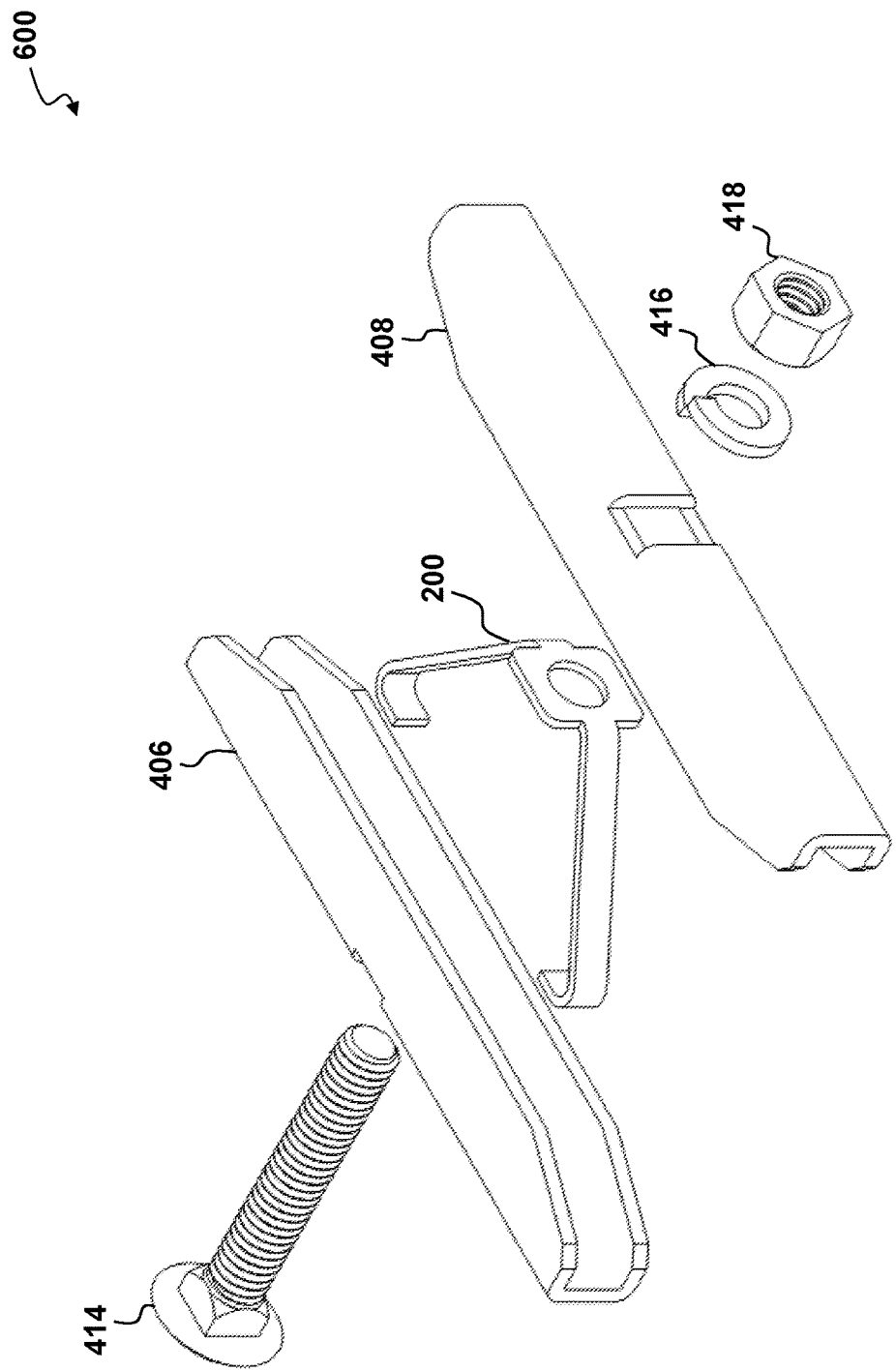
FIG. 6 depicts an exploded perspective view of the exemplary grounding clip and butt splice kit of FIG. 4.

FIG. 6 depicts an exploded perspective view of the exemplary grounding clip and butt splice kit of FIG. 4 600. The butt splice kit includes the bolt 414, the first clamp 406, the second clamp 408, the washer 416, and the nut 418. The grounding clip 200 is disposed between the first clamp 406 and the second clamp 408 with the head of the grounding clip 200 resting on top of the second clamp. In some embodiments, the head of the grounding clip may be below the second clamp 408 and secured via the washer 416 and/or nut 418.

Figure 7A:
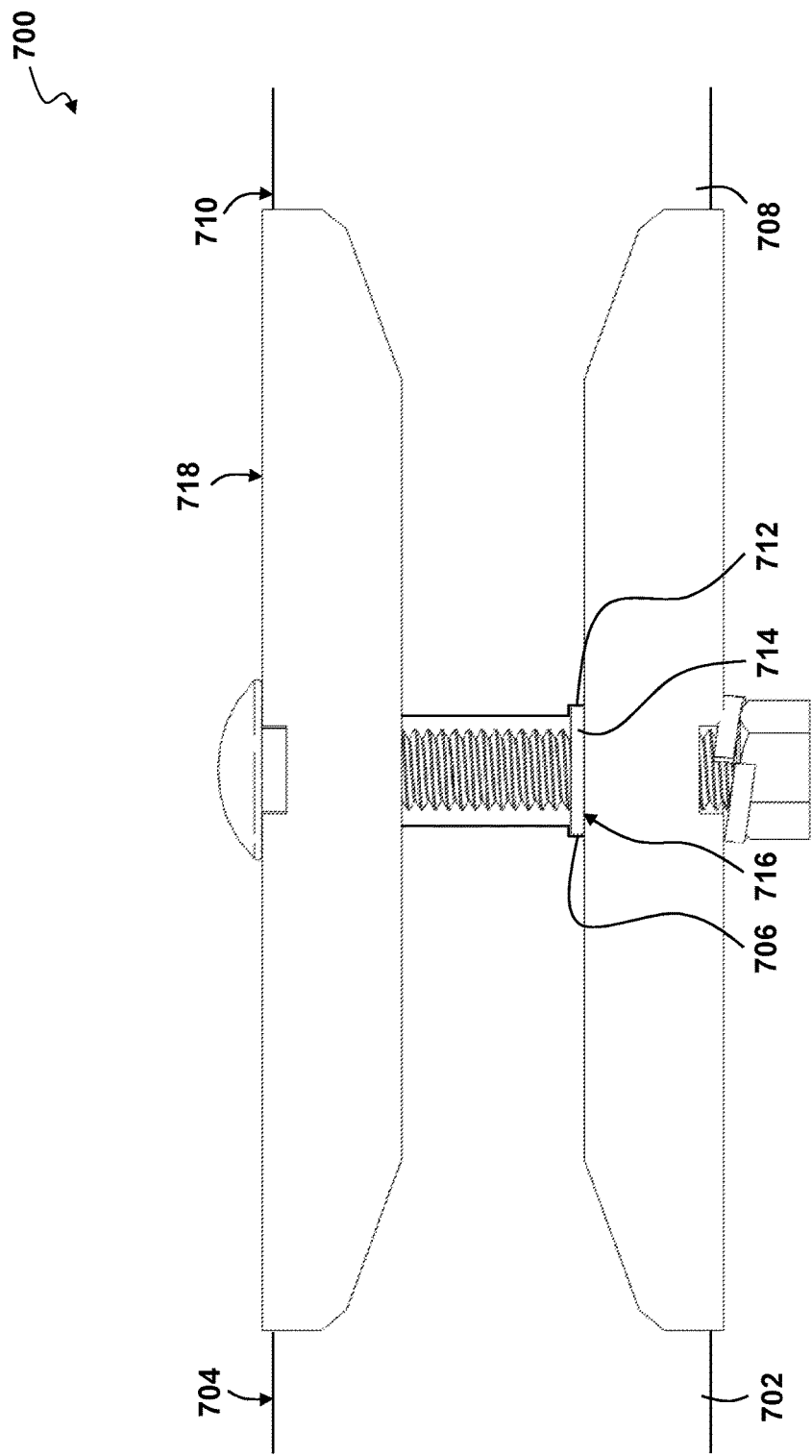
FIG. 7A depicts an exemplary grounding clip installed in a butt splice kit connecting two exemplary cable runway sections having notches for fitting the grounding clip.

FIG. 7A depicts an exemplary grounding clip installed in a butt splice kit connecting two exemplary cable runway sections having notches for fitting the grounding clip 700. A first stringer 702 of a first cable runway section 704 has a first notch 706. A second stringer 708 of a second cable runway section 710 has a second notch 712. A head 714 of a grounding clip 716 may fit into the notches (706, 712). The notches (706, 712) may provide an alignment guide to an installer and may be present on one side, i.e., one stringer of the two parallel stringers in a cable runway. The notches (706, 712) may ensure that each of the stringers are properly spaced and/or positioned relative to the butt splice kit 718 and grounding clip 716 such that the tabs of the grounding clip 716 are not placed on a recess of an edge of a stringer that may have a non-conductive covering, such as a powder coating and/or paint. The notches (706, 712) may also serve as a visual confirmation that the grounding clip 716 has been installed and that the entire cable runway is properly grounded.

Figure 7B:
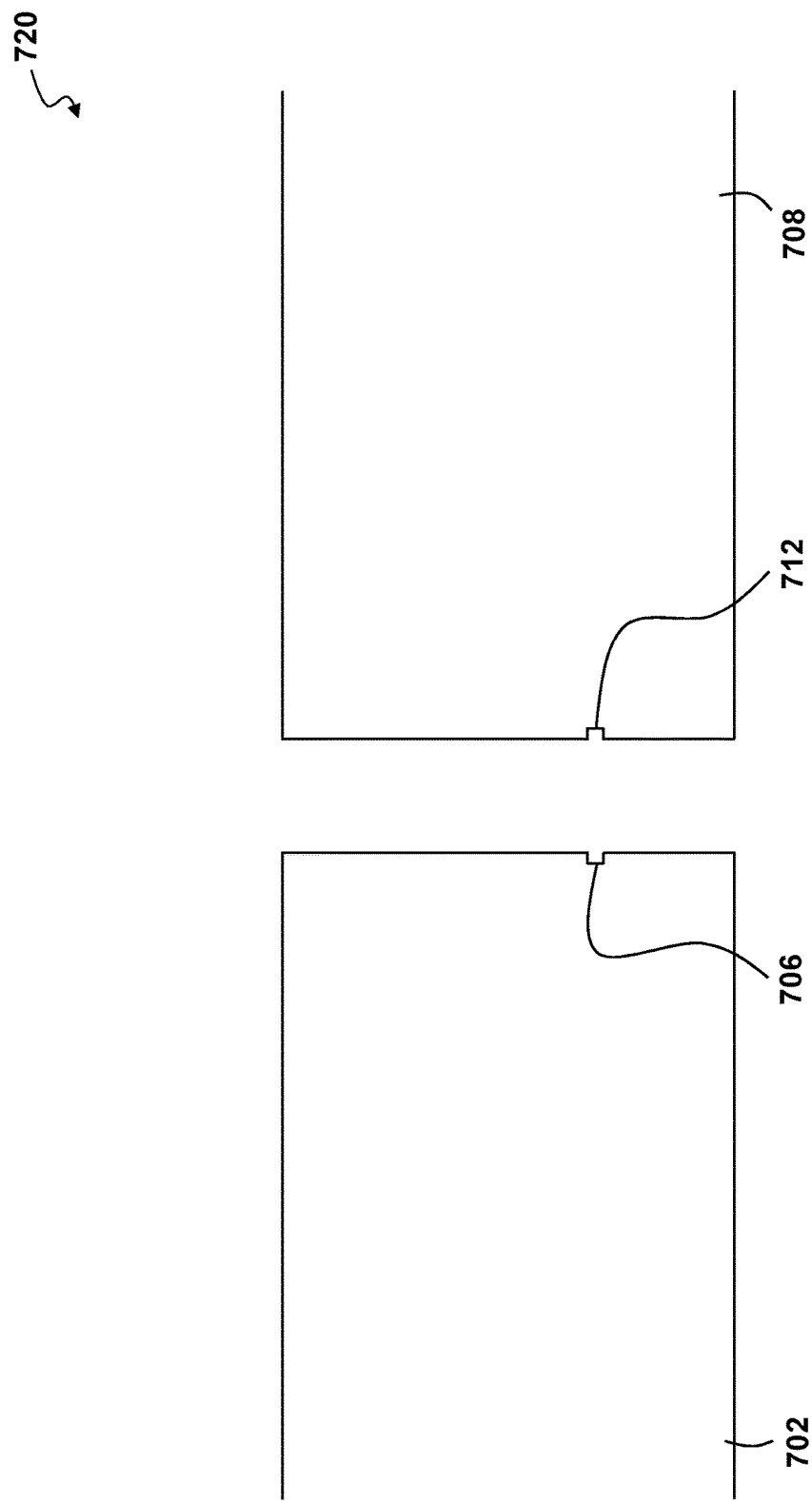
FIG. 7B depicts two exemplary cable runway sections having notches for fitting the grounding clip.

FIG. 7B depicts two exemplary cable runway sections having notches 720. The first stringer 702 has a first notch 706 and the second stringer 708 has a second notch 712. In some embodiments, only one of the stringers may have a notch. The notches (706, 712) in each stringer may be identical. The notches (706, 712) and grounding clip head (See FIG. 7A), are depicted as having a generally rectangular shape. In some embodiments, the notches and/or grounding clip head may be in any variety of shapes, number of faces, angle of faces, widths, and/or depths. The notches may create a snap fit with the grounding clip head upon sufficient tightening of a nut in the butt splice kit to indicate that installation is complete and proper to an installer.

Figure 8A:
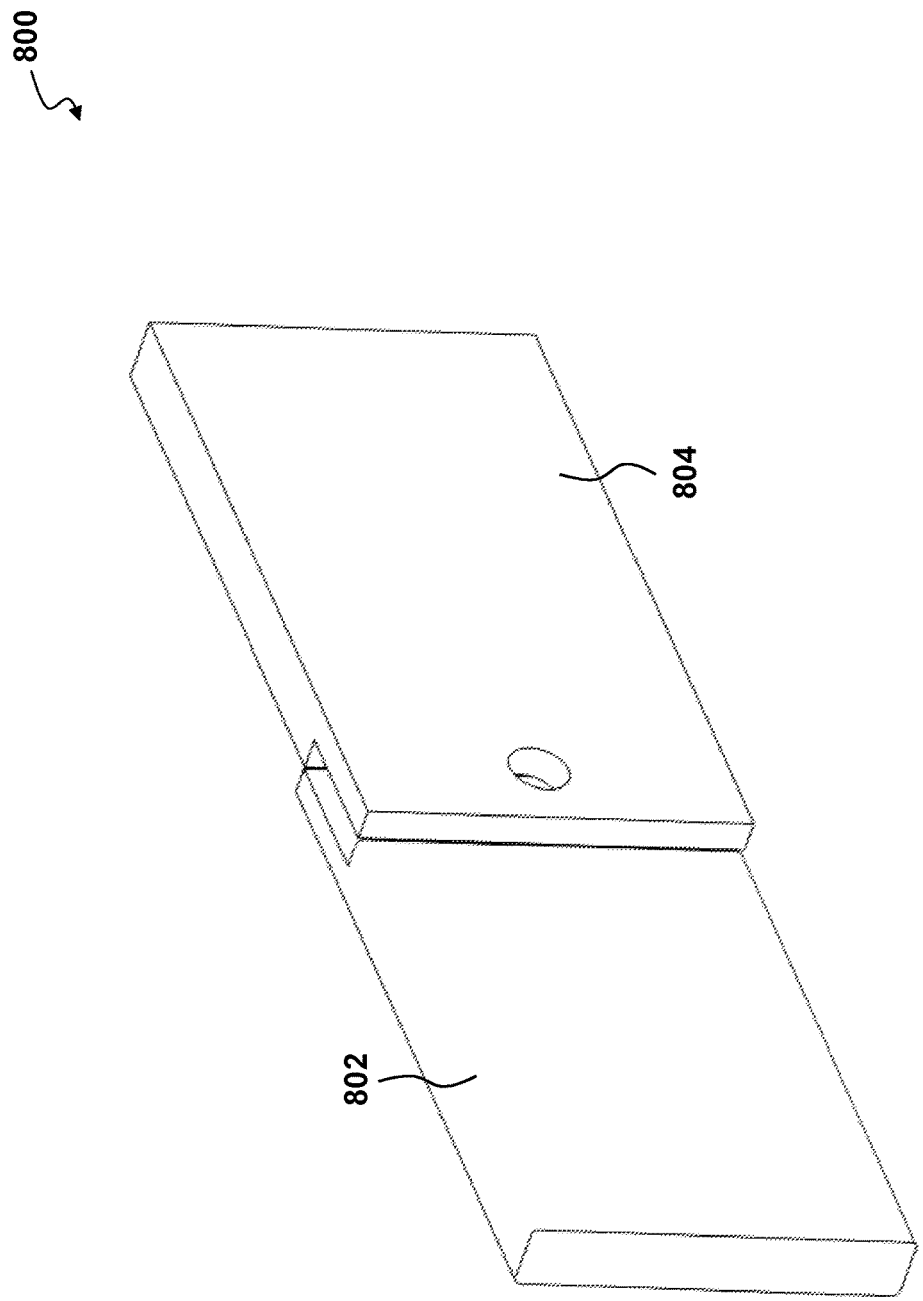
FIG. 8A depicts a perspective view of an exemplary grounding bracket for electrically connecting two adjacent cable runway sections.
Figure 8B:
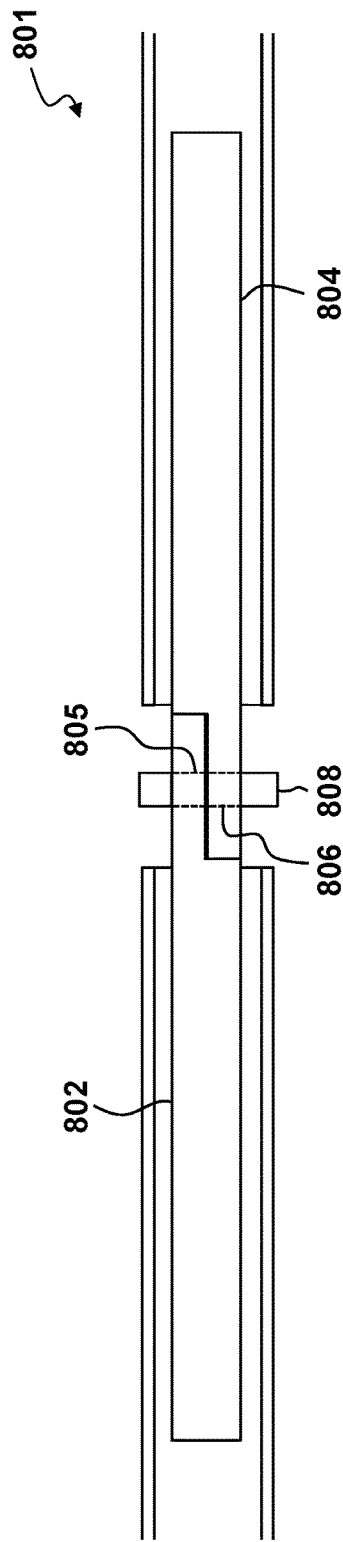
FIGS. 8B-8C depict cross-sectional views of the exemplary grounding bracket of FIG. 8A in a non-deployed and a deployed state, respectively.
Figure 8C:
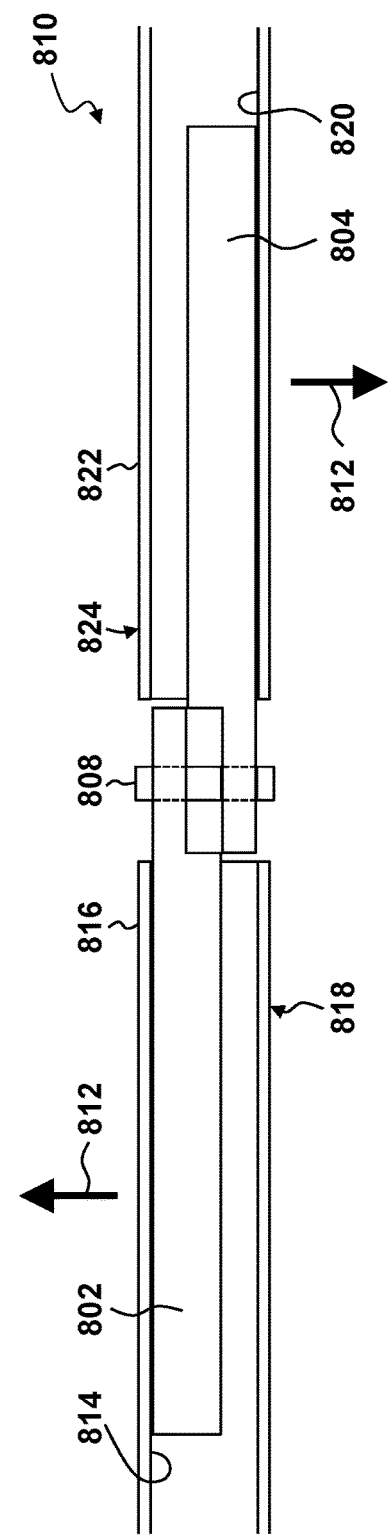

FIG. 8A depicts a perspective view of an exemplary grounding bracket for electrically connecting two adjacent cable runway sections 800. The exemplary grounding bracket 800 includes two brackets (802, 804). FIGS. 8B-8C depict the exemplary grounding bracket of FIG. 8A in a non-deployed and a deployed state, respectively. FIG. 8B depicts an exemplary grounding bracket in a non-deployed state disposed in two adjacent stringers 801. A first grounding bracket 802 has an L-shaped cross section and an aperture 805, depicted with dashed lines, disposed in a narrow portion of the first grounding bracket 802. A second grounding bracket 804 has an L-shaped cross section and an aperture 806, depicted with dashed lines, disposed in a narrow portion of the second grounding bracket 804. A set screw 808 is disposed in the aperture 804 of the first bracket 802 and the aperture 806 of the second bracket. The brackets (802, 804) may be identical and may nest together in the non-deployed state for ease of insertion into adjacent cable runway sections.

FIG. 8C depicts the exemplary grounding bracket of FIG. 8B in a deployed state disposed in two adjacent stringers 810. Rotation of the set screw 808 increases 812 a distance between the first grounding bracket 802 and the second grounding bracket 804. This increase 812 causes the first grounding bracket 802 to contact an inner wall 814 of a first stringer 816 of a first cable runway section 818, and causes the second grounding bracket 804 to contact an inner wall 820 of a second stringer 822 of a second cable runway section 824. An electrical connection between the first cable runway section 818 and the second cable runway section 824 is established via the first grounding bracket 802, the second grounding bracket 804, and the set screw 808.

Figure 9:
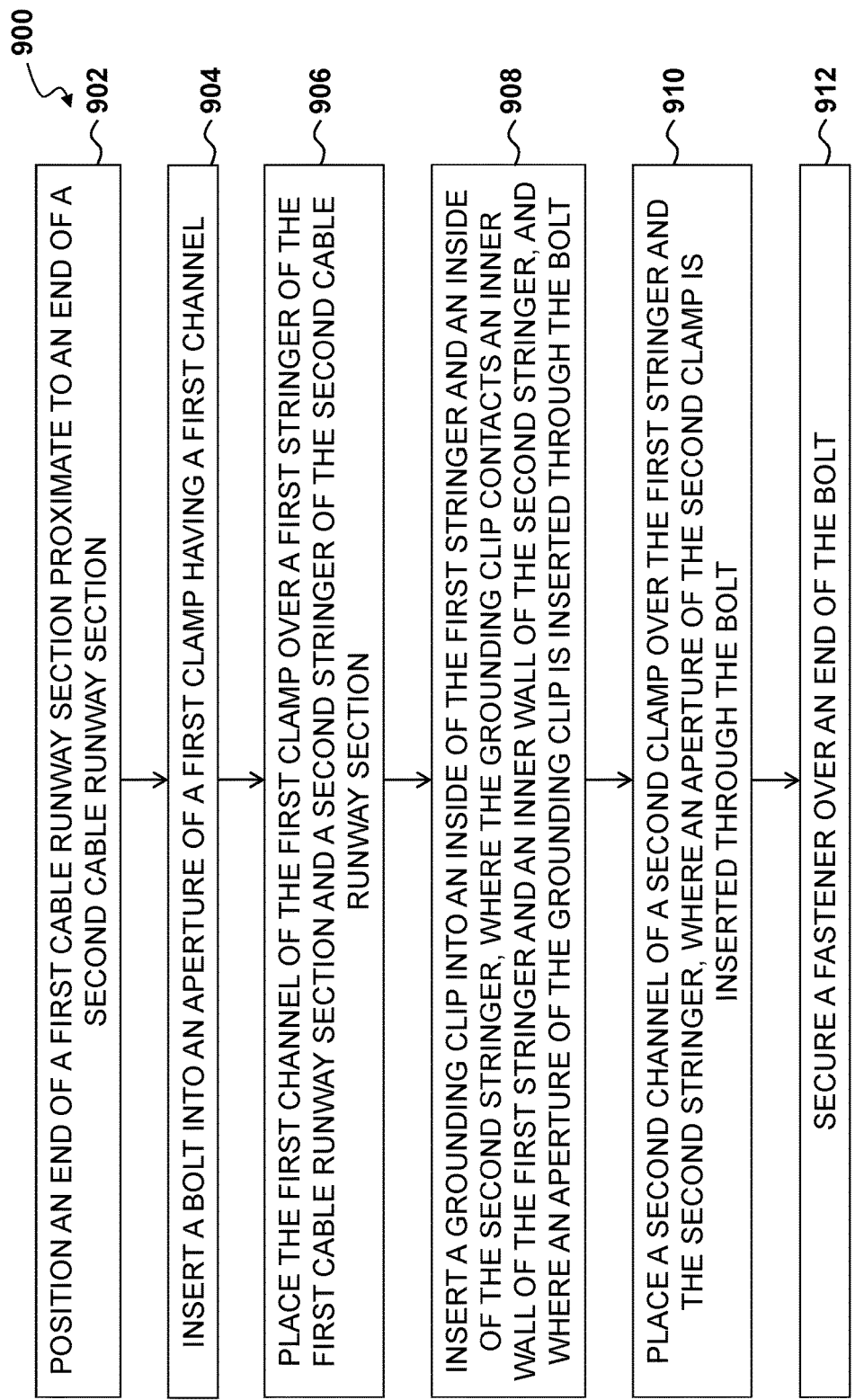
FIG. 9 depicts an exemplary functional block diagram of a method embodiment for installing a butt splice kit with an exemplary grounding clip to electrically connect two adjacent cable runway sections.

FIG. 9 depicts an exemplary functional block diagram of a method embodiment for installing a butt splice kit with an exemplary grounding clip to electrically connect two adjacent cable runway sections 900. An installer of the disclosed exemplary grounding clip does not need special tools, e.g., a high speed rotary tool to grind of a powder coating and drill to make holes, special qualifications, and/or special training to install the exemplary grounding clip. Additionally, the disclosed method for installing the disclosed grounding clip does not result in airborne particles, e.g., powder coating, paint and/or metal, that may damage expensive electrical equipment proximate to where the cable runway is being installed, e.g., a clean room and/or server room. An installer may position an end of a first cable runway section proximate to an end of a second cable runway section (step 902). An installer may then insert a bolt into an aperture of a first clamp having a first channel (step 904). The installer may then place the first channel of the first clamp over a first stringer of the first cable runway section and a second stringer of the second cable runway section (step 906). The installer may insert a grounding clip into an inside of the first stringer and an inside of the second stringer, where the grounding clip contacts an inner wall of the first stringer and an inner wall of the second stringer, and where an aperture of the grounding clip is inserted through the bolt (step 908). The installer may then place a second channel of a second clamp over the first stringer and the second stringer, where an aperture of the second clamp is inserted through the bolt (step 910). The installer then secures a fastener, e.g., a nut and washer, over an end of the bolt (step 912). An electrical connection between the first cable runway section and the second cable runway section is established via the grounding clip.

Figure 10E:
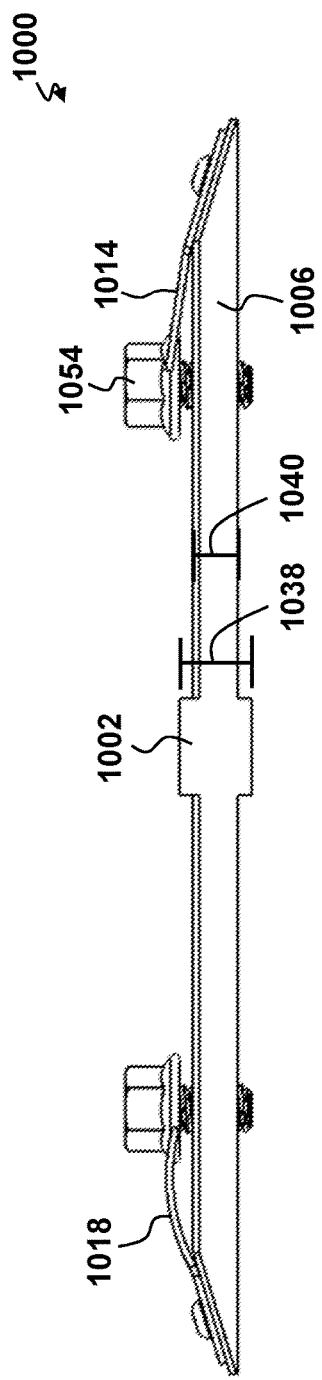
Figure 10F:
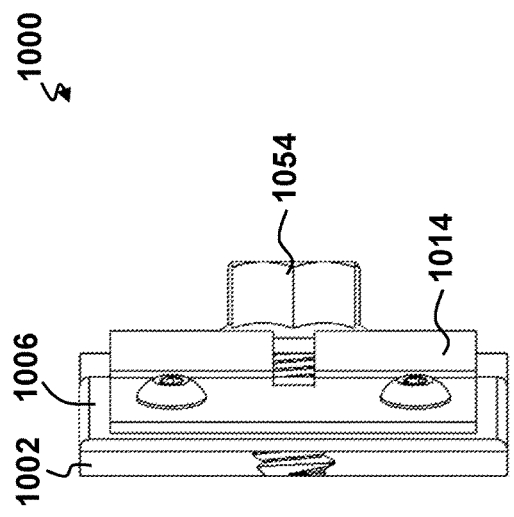

FIGS. 10A-10B depict perspective views of an alternative embodiment of an exemplary grounding clip 1000. FIG. 10C-10F depict front, back, top, and side views, respectively, of the exemplary grounding clip 1000 of FIG. 10A. The ground clip 1000 may include a head 1002 comprising an aperture 1004 disposed in the head. A first leg 1006 is connected to a first edge 1008 of the head 1002. A second leg 1010 is connected to a second edge 1012 of the head 1002. The first leg 1006 and the second leg 1010 may be substantially parallel. In some embodiments, the first leg 1006 and the second leg 1010 may be identical. The grounding clip 1000 may have an identical left and right side mirrored about a centerline 1036.

A first resilient tab 1014 is connected to the first leg 1006 at an end 1016 distal from the end connected to the head 1002. A second resilient tab 1018 is connected to the second leg 1010 at an end 1020 distal from the end connected to the head 1002. The resilient tab may have a split 1022 extending from a first side 1024 of the resilient tab 1014 towards the second side 1026 of the resilient tab 1014. In some embodiments, the resilient tab may be a single piece without a split. The split 1022 may ensure electrical contact between the resilient tab 1014 and an inside wall of a stringer of a cable runway if the grounding clip 1000 is installed backwards and/or if there are any defects or abnormalities in the manufacture of the cable runway to prevent the necessary surface contact to electrically ground the cable runway to an adjacent cable runway. Some cable runways may have a raised section as part of the manufacturing process and the split 1022 ensures that the surface area of the inside of the cable runway stringer being contacted is not reduced to below desired levels. In some embodiments, the surface area of the resilient tabs 1014, 1018 may be increased to ensure electrical contact. The first and second resilient tabs 1014, 1018 may be identical.

The first resilient tab 1014 may include one or more apertures 1028 proximate the second side 1026 of the resilient tab 1014. The second side 1026 of the resilient tab may be proximate the end 1016 of the first leg distal from the end connected to the head 1002. One or more fasteners 1030, such as bolts, screws, adhesives, etc. may be disposed through the one or more apertures 1028 in the first resilient tab 1014 to secure the first resilient tab 1014 to the first leg 1006. The first resilient tab 1014 is electrically connected to the first leg 1006, the head 1002, the second leg 1010, and the second resilient tab 1018. The resilient tabs 1014, 1018 are depicted as separate parts attached to the grounding clip 1000. In some embodiments, the resilient tabs, first leg, second leg, and/or head may be a single part or a plurality of parts.

The first resilient tab 1014 is connected to the first leg 1006 at a front face 1032 of the first leg 1006. The end 1016 of the first leg 1006 distal from the end connected to the head 1002 may be tapered on the front face 1032. The tapering may ensure that the resilient tab 1014 extends out from the front face 1032 of the grounding clip 1000 to contact an inner wall of a stringer of a cable runway section when the grounding clip is inserted into the cable runway section. The distal end of the first leg 1006 and the distal end of the second leg 1010 may be equidistant from a center 1036 of the aperture 1004 of the head.

A width 1038 of the head 1002 is greater than a width 1040 of the first leg 1006. The width of the first leg 1006 and the second leg 1010 may be identical. A height 1042 of the head may be substantially equal to a height 1042 of the first leg. The height of the first leg 1006 and the second leg 1010 may be identical. The width 1038 of the head 1002 may be greater than an opening in a stringer of a first cable runway section. The width 1038 of the head 1002 is substantially equal to an outside width of a stringer of a first cable runway section.

Figure 11A:
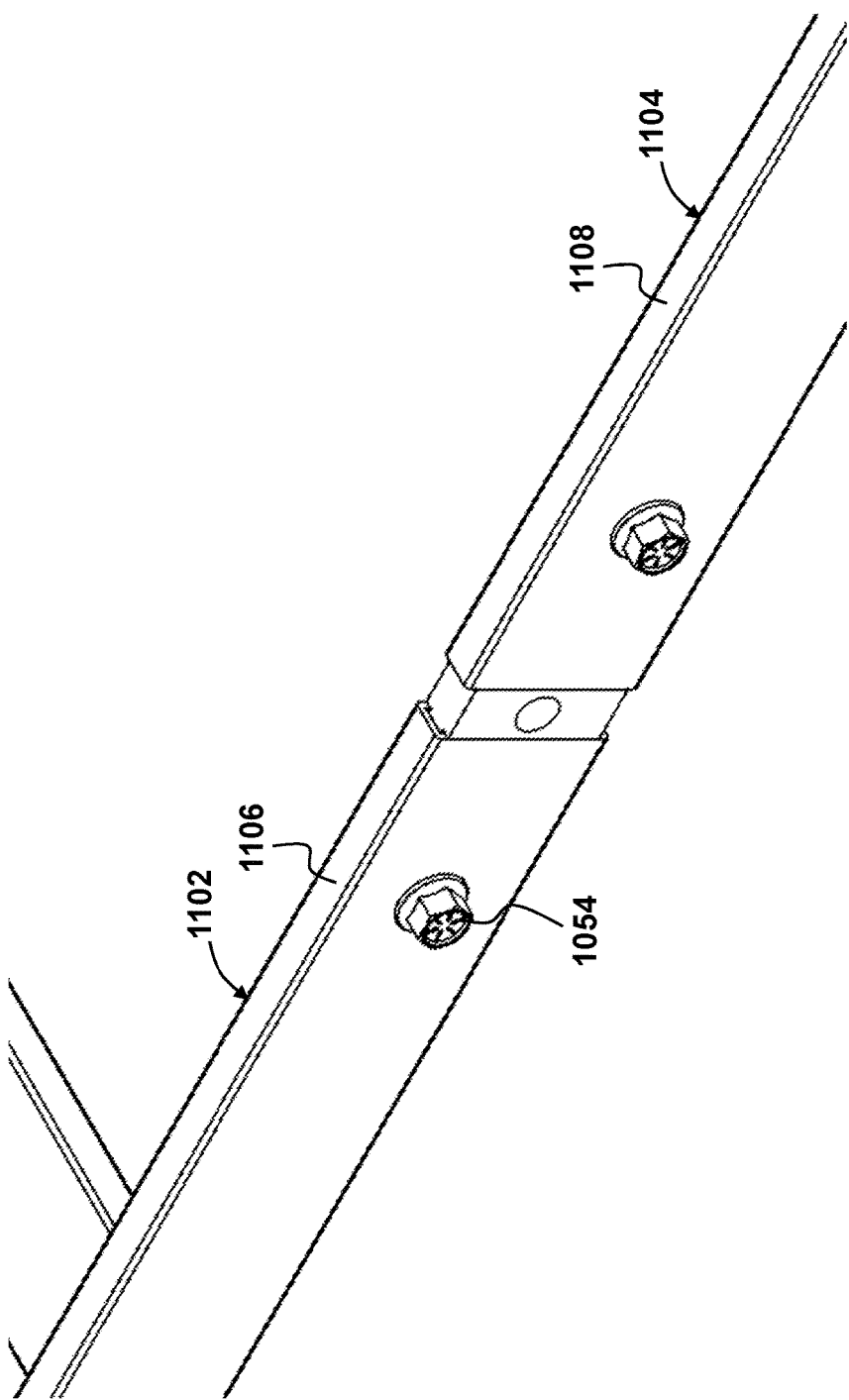
FIGS. 11A-11B depict perspective views of the exemplary grounding clip of FIG. 10A connecting two cable runway sections.
Figure 11B:
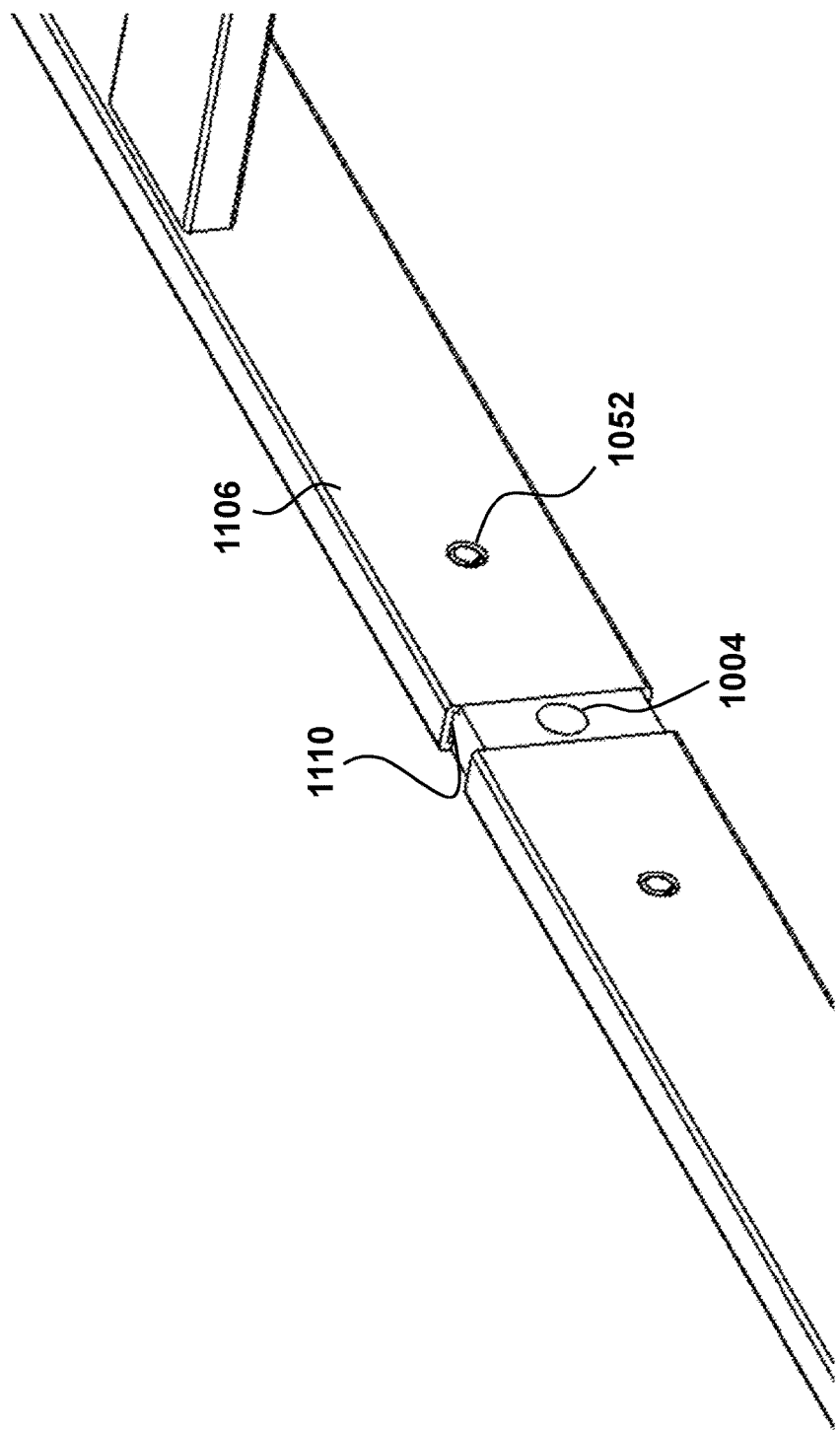

FIGS. 11A-11B depict perspective views of the exemplary grounding clip of FIG. 10A connecting two cable runway sections. FIGS. 11C-11E depict back, front, and top views, respectively, of the exemplary grounding clip of FIG. 10A connecting two cable runway sections. When the grounding clip 1002 is inserted into the openings of two stringers of two adjacent cable runway sections, the outer surfaces of the head 1002 may be substantially in line with the outer surfaces of the stringers of the cable runway sections. The dimensions of the head 1002 may ensure uniform installation of the grounding clip 1000 by ensuring that the head 1002 is in contact with the outer surface of the stringers to create a uniform spacing between the adjacent cable runway sections.

An aperture 1050 may be disposed in the first leg 1006. A first cable runway section 1102 may include a stringer 1106 and the stringer may include an aperture 1052. The aperture 1050 disposed in the first leg of the grounding clip aligns with the aperture 1052 disposed in the stringer when the first leg of the grounding clip is inserted into an opening 1110 in the stringer. A fastener 1054 may be inserted through the aperture 1052 disposed in the stringer and the aperture disposed in the first leg of the grounding clip, where the fastener 1054 secures the grounding clip to the first cable runway section 1102. An identical aperture may be present on the second cable runway section to secure to the second leg of the grounding clip. The apertures in the cable runway section allow for uniform installation and visual confirmation, along with the head of the grounding clip, that the grounding clip has been installed and that the two cable runway sections 1102, 1104 are electrically connected. The disclosed grounding clip may be installed in only one stringer of the two parallel stringers of the cable runway sections. In other embodiments, the disclosed grounding clip may be installed in both parallel stringers of the cable runway sections.

Figure 12A:
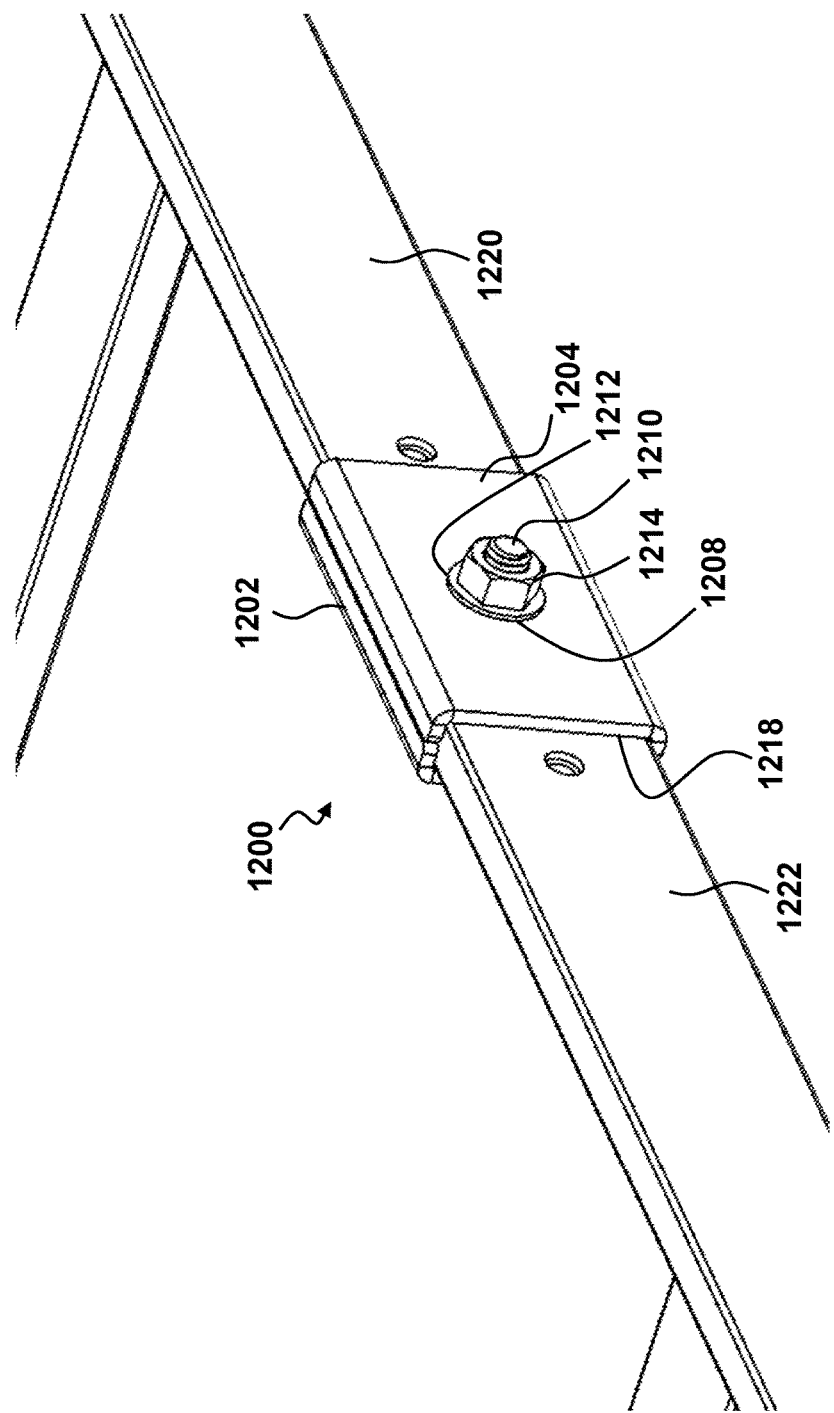
FIGS. 12A-12B depict perspective views of an exemplary butt splice kit connecting two exemplary cable runway sections having apertures corresponding to apertures in the grounding clip.
Figure 12B:
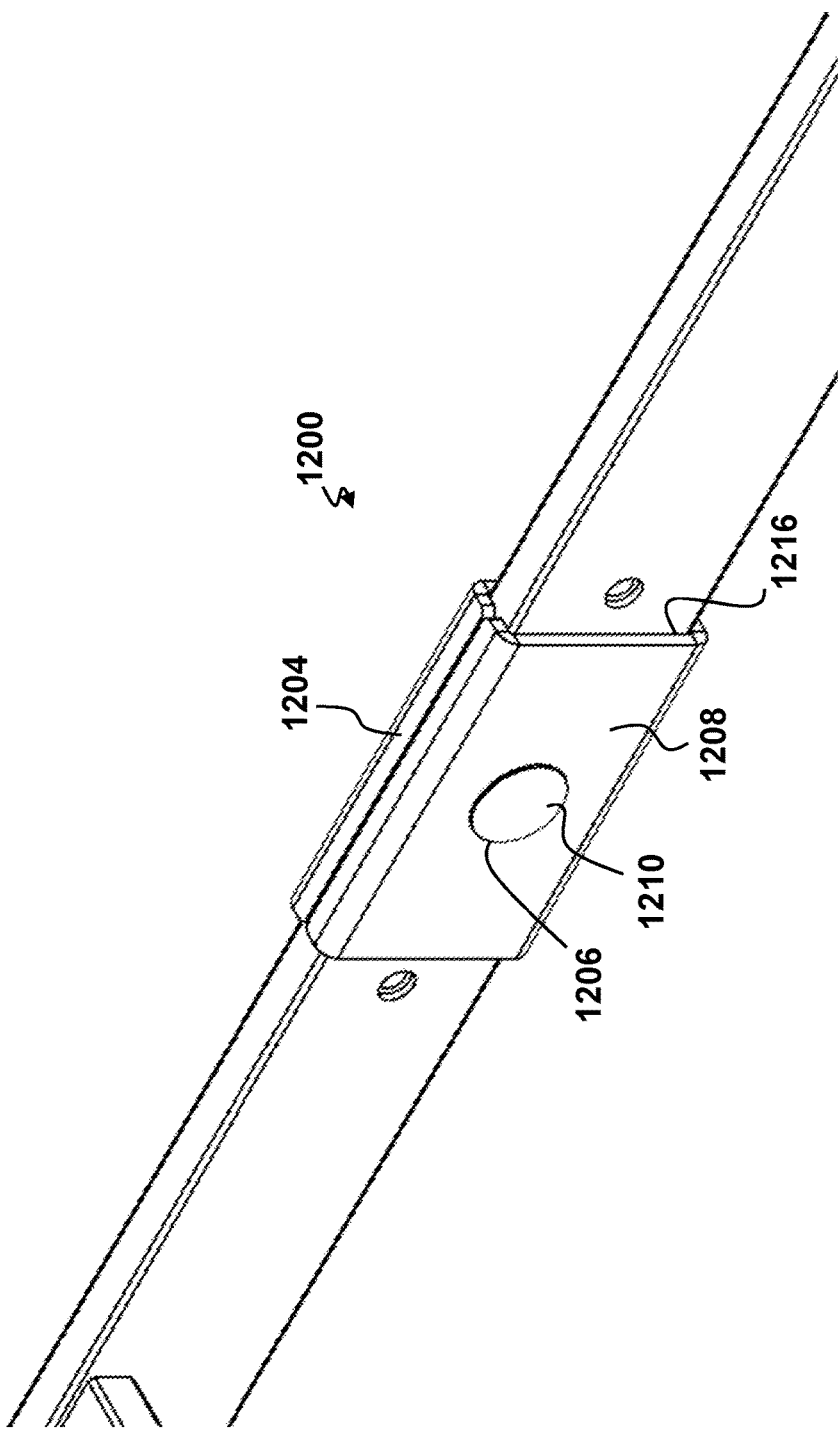

FIGS. 12A-12B depict perspective views of an exemplary butt splice kit 1200 connecting two exemplary cable runway sections having apertures corresponding to apertures in the grounding clip. The butt splice kit 1200 includes a first clamp 1202 comprising a first channel 1216 and an aperture 1206. The butt splice kit 1200 also includes a second clamp 1204 comprising a second channel 1218 and an aperture 1208. The butt splice kit 1200 also includes a fastener to connect the first clamp 1202 and the second clamp 1204, such as a bolt 1210, washer 1212, and nut 1214. The bolt 1210 of the butt splice kit 1200 is disposed through the aperture 1206 in the first clamp 1202, the aperture in the head of the grounding clip, and the aperture 1208 in the second clamp 1204. An electrical connection between the first stringer 1220 of the first cable runway section and the second stringer 1222 of the second cable runway section is established via the grounding clip. The head of the grounding clip is at least partially covered by the butt splice kit 1200. The butt splice kit 1200 may provide additional strength to the connection between the adjacent cable runway sections. The butt splice kit 1200 may be used in addition to the fasteners and apertures in the stringers 1220, 1222 and ground clip legs or in place of these features.

Figure 13:
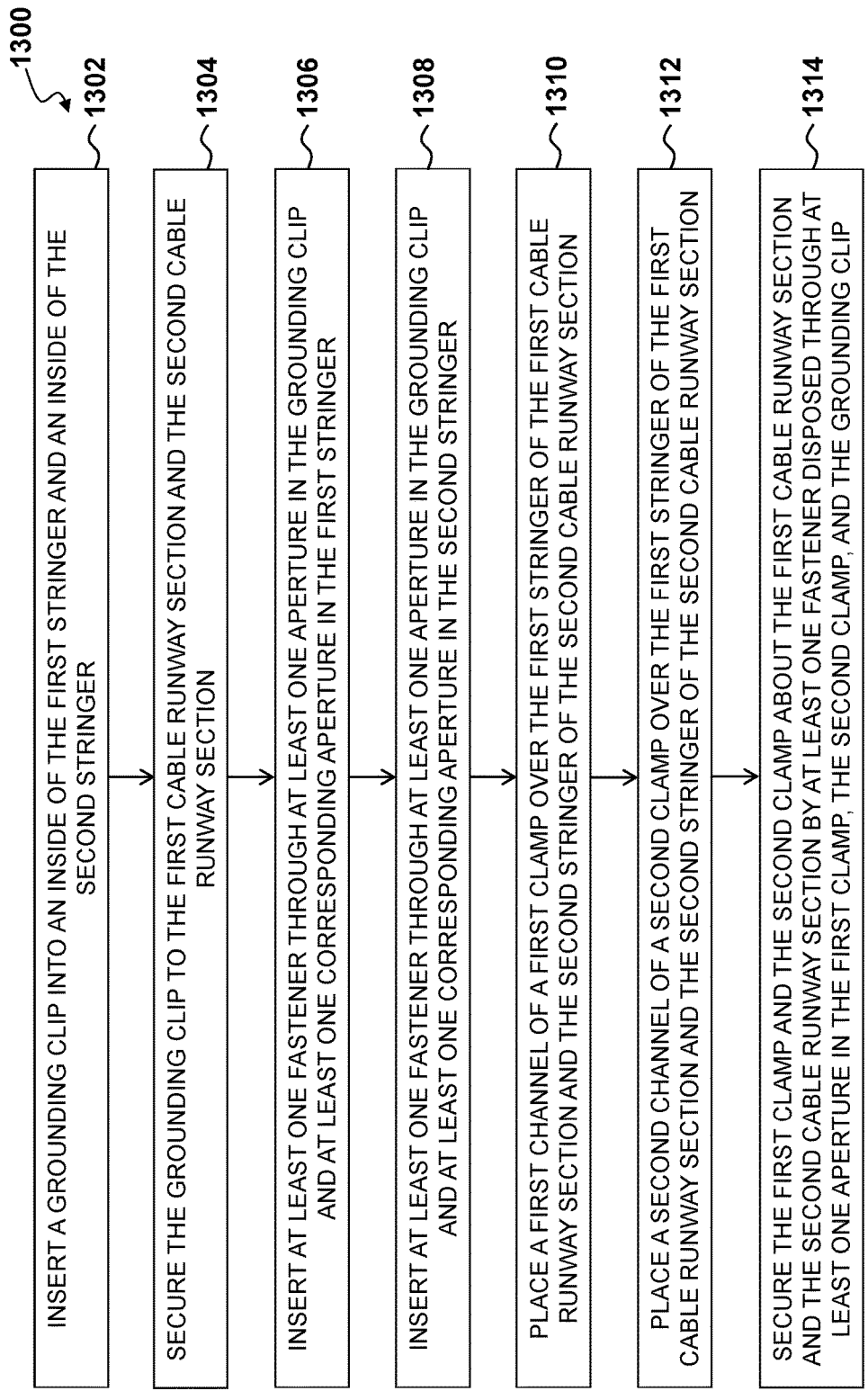
FIG. 13 depicts a functional block diagram of another exemplary method embodiment for installing a butt splice kit with an exemplary grounding clip to electrically connect two adjacent cable runway sections.

FIG. 13 depicts a functional block diagram of another exemplary method embodiment for installing a butt splice kit with an exemplary grounding clip to electrically connect two adjacent cable runway sections 1300. An installer of the disclosed exemplary grounding clip does not need special tools, e.g., a high speed rotary tool to grind of a powder coating and drill to make holes, special qualifications, and/or special training to install the exemplary grounding clip. Additionally, the disclosed method for installing the disclosed grounding clip does not result in airborne particles, e.g., powder coating, paint and/or metal, that may damage expensive electrical equipment proximate to where the cable runway is being installed, e.g., a clean room and/or server room.

An installer may insert a grounding clip into an inside of the first stringer and an inside of the second stringer (step 1302). The grounding clip contacts an inner wall of the first stringer and an inner wall of the second stringer. The installer may then secure the grounding clip to the first cable runway section and the second cable runway section (step 1304). An electrical connection between the first cable runway section and the second cable runway section is established via the grounding clip. Securing the grounding clip may further have the installer insert at least one fastener through at least one aperture in the grounding clip and at least one corresponding aperture in the first stringer (step 1306). The installer may then insert at least one fastener through at least one aperture in the grounding clip and at least one corresponding aperture in the second stringer (step 1308). If a clamp is desired, the installer may place a first channel of a first clamp over the first stringer of the first cable runway section and the second stringer of the second cable runway section (step 1310). The installer may then place a second channel of a second clamp over the first stringer of the first cable runway section and the second stringer of the second cable runway section (step 1312). The installer may secure the first clamp and the second clamp about the first cable runway section and the second cable runway section by at least one fastener disposed through at least one aperture in the first clamp, the second clamp, and the grounding clip (step 1314). In some embodiments, the clamp may be used in place of the fasteners inserted through the apertures in the legs of the grounding clip and stringers of the cable runway sections. In other embodiments, the clamp may not be used.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A system comprising:
    a grounding clip comprising:
        a head comprising an aperture disposed in the head;
        a first leg connected to a first edge of the head;
        a second leg connected to a second edge of the head, wherein the first leg and the second leg are substantially parallel;
        a first resilient tab connected to the first leg at an end distal from the end connected to the head; and
        a second resilient tab connected to the second leg at an end distal from the end connected to the head;
    wherein a width of the head is greater than a width of the first leg, and wherein the width of the head is substantially equal to an outside width of a stringer of a first cable runway section.

2. The system of claim 1 wherein the first resilient tab comprises a split extending from a first side of the resilient tab towards the second side of the resilient tab.

3. The system of claim 2 wherein the first resilient tab comprises one or more apertures proximate the second side of the resilient tab, wherein the second side of the resilient tab is proximate the end of the first leg distal from the end connected to the head.

4. The system of claim 3 further comprising:
    one or more fasteners, wherein the one or more fasteners are disposed through the one or more apertures in the first resilient tab to secure the first resilient tab to the first leg.

5. The system of claim 1 wherein the first resilient tab is connected to the first leg at a front face of the first leg.

6. The system of claim 1 wherein the end of the first leg distal from the end connected to the head is tapered on the front face.

7. The system of claim 1 wherein the distal end of the first leg and the distal end of the second leg are equidistant from a center of the aperture of the head.

8. The system of claim 1 wherein a height of the head is substantially equal to a height of the first leg.

9. The system of claim 1 wherein the width of the head is greater than an opening in the stringer of the first cable runway section.

10. The system of claim 1 further comprising:
    an aperture disposed in the first leg.

11. The system of claim 10 further comprising:
    the first cable runway section comprising the stringer, wherein the stringer comprises an aperture.

12. The system of claim 11 wherein the aperture disposed in the first leg aligns with the aperture disposed in the stringer when the first leg of the grounding clip is inserted into an opening in the stringer.

13. The system of claim 12 further comprising a fastener, wherein the fastener is inserted through the aperture disposed in the stringer and the aperture disposed in the first leg of the grounding clip, wherein the fastener secures the grounding clip to the first cable runway section.

14. A system comprising:
    a grounding clip comprising:
        a head comprising an aperture disposed in the head;
        a first leg connected to a first edge of the head;
        a second leg connected to a second edge of the head, wherein the first leg and the second leg are substantially parallel;
        a first resilient tab connected to the first leg at an end distal from the end connected to the head; and
        a second resilient tab connected to the second leg at an end distal from the end connected to the head;
    a butt splice kit comprising:
        a first clamp comprising a first channel and an aperture;
        a second clamp comprising a second channel and an aperture; and
        a bolt;
        wherein the bolt of the butt splice kit is disposed through the aperture in the first clamp, the aperture in the head of the grounding clip, and the aperture in the second clamp.

15. The system of claim 14 further comprising:
    A first cable runway section comprising a first stringer;
    A second cable runway section comprising a second stringer;
    wherein the grounding clip is inserted into an opening of the first stringer and an opening of the second stringer;
    wherein the first clamp and the second clamp are disposed about a portion of the first stringer and the second stringer; and
    wherein an electrical connection between the first cable runway section and the second cable runway section is established via the first resilient tab and second resilient tab of the grounding clip.

16. A method comprising:
    inserting a grounding clip into an inside of the first stringer and an inside of the second stringer, wherein the grounding clip contacts an inner wall of the first stringer and an inner wall of the second stringer; and
    securing the grounding clip to the first cable runway section and the second cable runway section;
    wherein an electrical connection between the first cable runway section and the second cable runway section is established via the grounding clip.

17. The method of claim 16 wherein securing the grounding clip further comprises:

inserting at least one fastener through at least one aperture in the grounding clip and at least one corresponding aperture in the first stringer; and inserting at least one fastener through at least one aperture in the grounding clip and at least one corresponding aperture in the second stringer.

18. The method of claim 16 further comprising:

placing a first channel of a first clamp over the first stringer of the first cable runway section and the second stringer of the second cable runway section;

placing a second channel of a second clamp over the first stringer of the first cable runway section and the second stringer of the second cable runway section;

securing the first clamp and the second clamp about the first cable runway section and the second cable runway section by at least one fastener disposed through at least one aperture in the first clamp, the second clamp, and the grounding clip.

* * * * *